(12) United States Patent  
Yoshida

(10) Patent No.: US 9,030,443 B2  
(45) Date of Patent: May 12, 2015

(54) OPTICAL POSITION DETECTING DEVICE AND DISPLAY DEVICE WITH POSITION DETECTING FUNCTION

(75) Inventor: Kazuki Yoshida, Chino (JP)

(73) Assignee: Seiko Epson Corporation (JP)

( * ) Notice: Subject to any disclaimer, the term of this patent is extended or adjusted under 35 U.S.C. 154(b) by 495 days.

(21) Appl. No.: 13/107,244

(22) Filed: May 13, 2011

(65) Prior Publication Data

US 2011/0304589 A1    Dec. 15, 2011

(30) Foreign Application Priority Data

Jun. 11, 2010    (JP) ................. 2010-133678

(51) Int. Cl.  
*G06F 3/042* (2006.01)  
*G06F 3/041* (2006.01)

(52) U.S. Cl.  
CPC .... *G06F 3/0428* (2013.01); *G06F 2203/04101* (2013.01); *G06F 3/0416* (2013.01)

(58) Field of Classification Search  
USPC ............ 345/175; 250/221, 206, 338.1; 385/4, 385/14, 15, 16, 22; 315/159, 291  
See application file for complete search history.

(56) References Cited

U.S. PATENT DOCUMENTS

| | | | |
|---|---|---|---|
| 4,794,634 A | | 12/1988 | Torihata et al. |
| 5,887,089 A | * | 3/1999 | Deacon et al. ................... 385/22 |
| 5,912,997 A | * | 6/1999 | Bischel et al. ................... 385/15 |
| 5,978,524 A | * | 11/1999 | Bischel et al. ..................... 385/4 |
| 6,078,704 A | * | 6/2000 | Bischel et al. ..................... 385/4 |
| 6,118,908 A | * | 9/2000 | Bischel et al. ................... 385/14 |
| 6,167,169 A | * | 12/2000 | Brinkman et al. ................. 385/4 |
| 6,393,172 B1 | * | 5/2002 | Brinkman et al. ............... 385/16 |
| RE37,809 E | * | 7/2002 | Deacon et al. ................. 372/102 |
| 6,522,794 B1 | * | 2/2003 | Bischel et al. ..................... 385/4 |
| 7,435,940 B2 | * | 10/2008 | Eliasson et al. ............... 250/221 |
| 7,843,571 B2 | * | 11/2010 | Naya et al. ..................... 356/445 |
| 8,363,035 B2 | * | 1/2013 | Nakanishi ...................... 345/175 |
| 2010/0182294 A1 | | 7/2010 | Roshan et al. |
| 2010/0327766 A1 | * | 12/2010 | Recker et al. .................. 315/291 |
| 2011/0037732 A1 | * | 2/2011 | Takama et al. ................. 345/175 |
| 2011/0121654 A1 | * | 5/2011 | Recker et al. .................... 307/66 |
| 2011/0122108 A1 | | 5/2011 | Kozuma et al. |
| 2011/0133655 A1 | * | 6/2011 | Recker et al. .................. 315/159 |
| 2011/0164010 A1 | | 7/2011 | Yamamoto et al. |
| 2012/0019494 A1 | | 1/2012 | Lum et al. |
| 2012/0212375 A1 | * | 8/2012 | Depree, IV ............ 343/700 MS |

FOREIGN PATENT DOCUMENTS

JP    2005-173684    6/2005

* cited by examiner

*Primary Examiner* — Fred Tzeng  
(74) *Attorney, Agent, or Firm* — Harness, Dickey & Pierce, P.L.C.

(57) ABSTRACT

An optical position detecting device includes: a plurality of detection light source sections which includes a first light emitting element which emits a first detection light and a second light emitting element which is turned on at a timing different from a timing when the first light emitting element is turned on and emits a second detection light having a peak wavelength different from that of the first detection light; a light source driving section which turns on a part of the plurality of detection light source sections, and turns on the other part thereof; a light detecting section which detects the first detection light and the second detection light reflected by a object; and a position detecting section which detects the position of the object on the basis of the intensity of the first detection light and the intensity of the second detection light in the light detecting section.

16 Claims, 15 Drawing Sheets

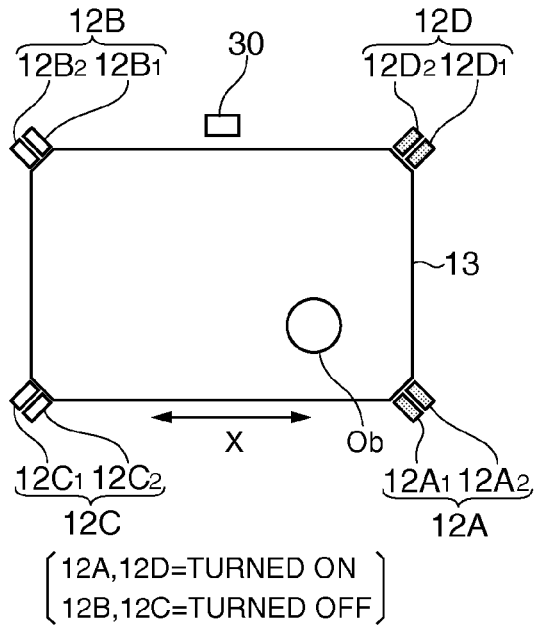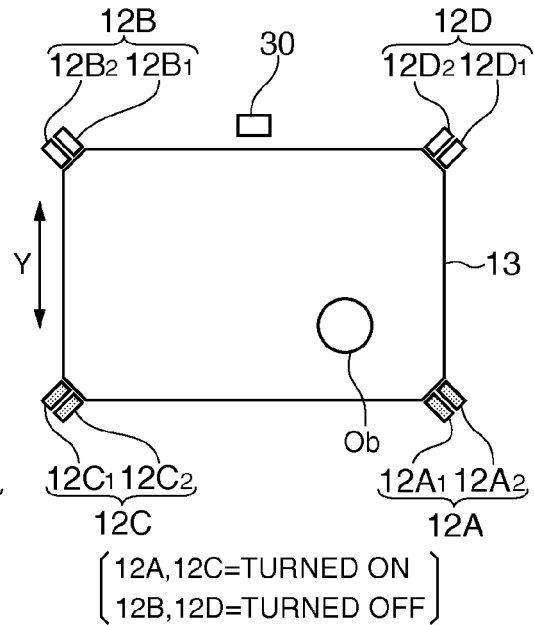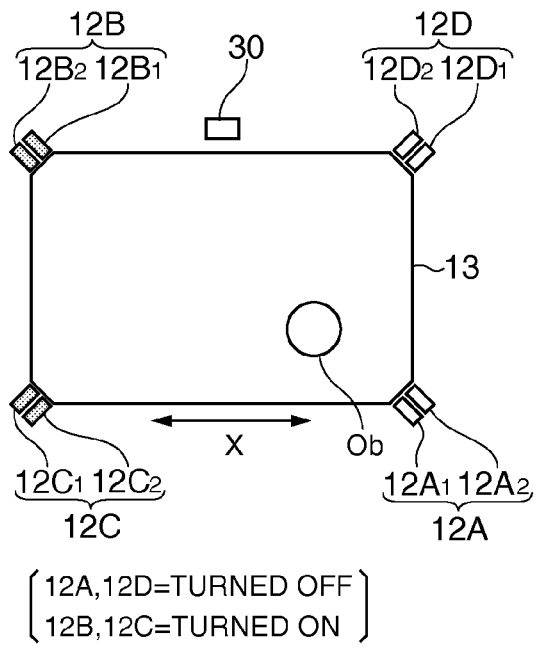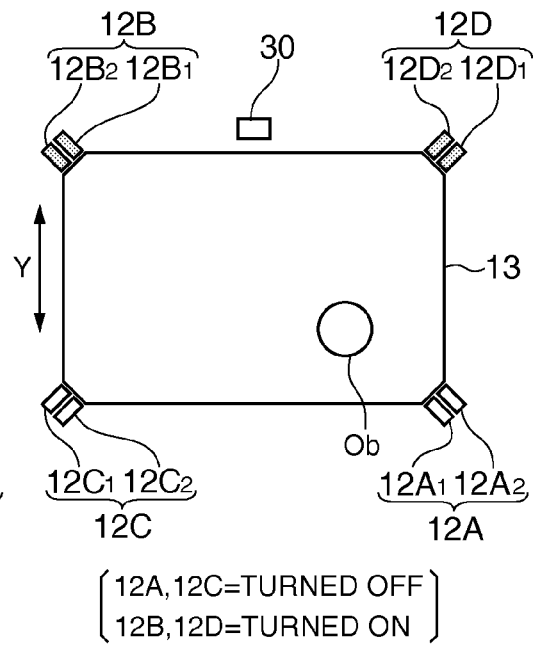

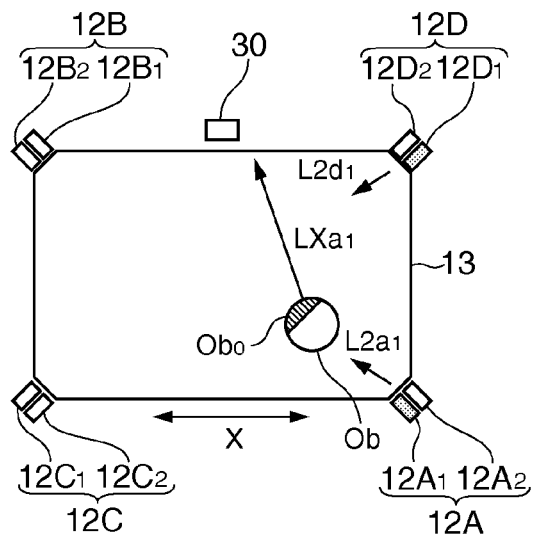
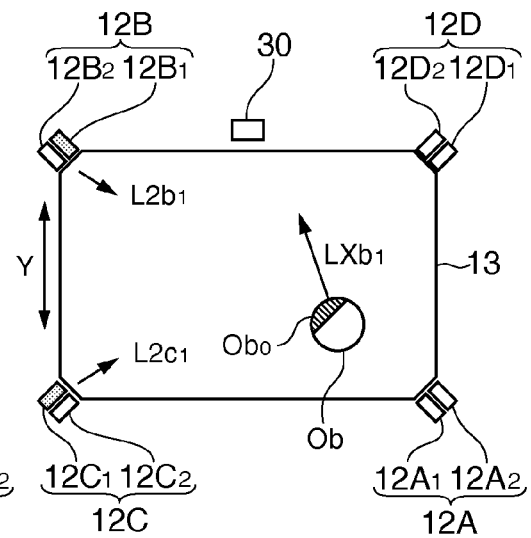
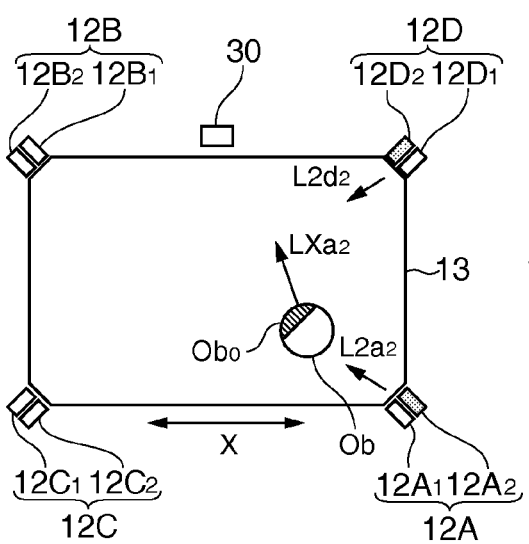
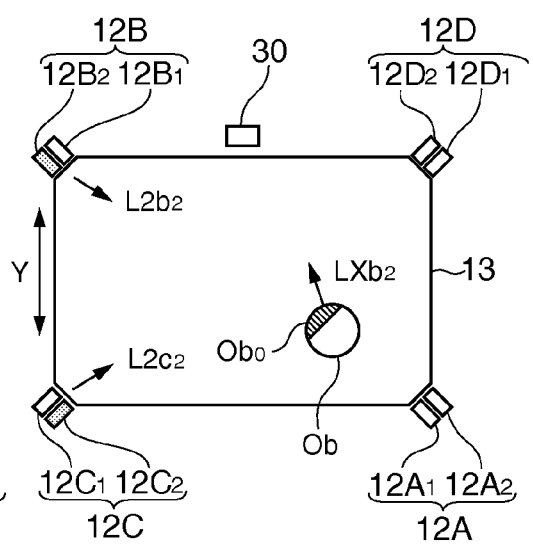

12A₁,12C₁=TURNED ON

12B₁,12D₁=TURNED ON

12A₂,12C₂=TURNED ON

12B₂,12D₂=TURNED ON

OPTICAL POSITION DETECTING DEVICE AND DISPLAY DEVICE WITH POSITION DETECTING FUNCTION

BACKGROUND

1. Technical Field

The present invention relates to an optical position detecting device which optically detects the position of a target object, and a display device with a position detecting function having the optical position detecting device.

2. Related Art

As an optical position detecting device which optically detects the position of a target object, a technique has been proposed which detects a position when light emitted from a light projection means is blocked by an indicating device and detects the light emitted from the indicating device to thereby detect the position of the indicating device (refer to JP-A-2005-173684).

However, in the case of the technique of using the light emitted from the indicating device, since input through a finger, hand, or the like is not possible, the usage thereof is limited.

Accordingly, as schematically shown in FIG. 15, the inventor has studied an optical position detecting device in which a detection light source 12 is disposed to face an end portion of a light guiding plate 13, and a reflected light obtained as a detection light L2 exiting from the light guiding plate 13 and contacting a target object Ob of a finger is detected by a light detector 30. In such an optical position detecting device, the detection light L2 exiting from the light guiding plate 13 forms a light intensity distribution in which light intensity monotonically decreases toward a side away from the side where the detection light source 12 is disposed, in an exiting space of the detection light L2. Accordingly, it is possible to detect the position of the target object Ob based on the detection intensity in the light detector 30. According to such a technique, the target object Ob may be a finger or the like, and may not necessarily be a light emitting indicating device.

However, in the method shown in FIG. 15, in a case where there exist portions having different reflection rates on the surface of the target object Ob, for example, in a case where there is a partial color difference or gloss difference on the target object Ob, even though the target object Ob is disposed in the same position, the detection intensity in the light detector 30 is changed, thereby deteriorating the detection accuracy.

SUMMARY

An advantage of some aspects of the invention is that it provides an optical position detecting device which is capable of detecting the position of a target object with high accuracy, even when there exist portions having different reflection rates in the target object when receiving light reflected by the target object to detect the position of the target object, and a display device with a position detecting function having the optical position detecting device.

According to an aspect of the invention, there is provided an optical position detecting device which optically detects the position of a target object, including: a plurality of detection light sources which includes a first light emitting element which emits a first detection light and a second light emitting element which is turned on at a timing different from a timing when the first light emitting element is turned on and emits a second detection light having a peak in a wavelength band different from that of the first detection light; a light source driving section which sequentially turns on the plurality of detection light sources; a light detector which detects the first detection light and the second detection light reflected by the target object which is disposed in a detection light exiting space to which the first detection light and the second detection light exit; and a position detecting section which detects the position of the target object in the detection light exiting space on the basis of the detection intensity of the first detection light and the detection intensity of the second detection light in the light detector when the plurality of detection light sources are sequentially turned on.

In this aspect, the position detecting section may detect the position of the target object in the detection light exiting space on the basis of the difference between the detection intensity of the first detection light and the detection intensity of the second detection light.

According to the aspect of the invention, the plurality of detection light sources is sequentially turned on to emit the detection lights (the first detection light and the second detection light), a part of the detection lights reflected by the target object which is disposed in the detection light exiting space are received by the light detector, and the position of the target object is detected on the basis of the detection intensities in the light detector. Thus, the target object may be a finger or the like, and may not necessarily be a light emitting indicating device. In such an optical position detecting device, in a case where the target object is a finger with nail polish applied, for example, the reflection intensity becomes high in the nail polished portion compared with other portions, and thus, positions other than the position of the target object influence the detection intensity in the light detector. Thus, according to this aspect, the first detection light and the second detection light which have peaks in different wavelength bands are used as the detection lights. Thus, if the peak in the second detection light is in a band corresponding to the wavelength band reflected by the nail polish, when there is a difference between the detection intensity of the first detection light and the detection intensity of the second detection light in the light detector, it is possible to compensate the amount of light intensity reflected by the nail polish from the detection intensity in the light detector. Thus, it is possible to detect the position of the target object with high accuracy.

In the aspect of the invention, the optical position detecting device may include a light guiding plate which is formed with a light incident section to which the first detection light and the second detection light emitted from the plurality of detection light sources are incident and a light exiting section from which the first detection light and the second detection light incident from the light incident section exit. A first light intensity distribution for a first coordinate detection in which the light intensity monotonically decreases from one side of a first direction which intersects with a light exiting direction of the first detection light and the second detection light from the light guiding plate toward the other side thereof, and a second light intensity distribution for the first coordinate detection in which the light intensity monotonically decreases from the other side of the first direction to the one side thereof, may be sequentially formed in the detection light exiting space, when the plurality of detection light sources is sequentially turned on. With such a configuration, it is possible to detect the position of the target object on the basis of the difference or ratio between the detection intensities in the light detector when the first light intensity distribution for the first coordinate detection and the second light intensity distribution for the first coordinate detection are formed. Thus, it is possible to detect the position of the target object without influence of environmental light or the like, compared with a case where the position of the target object is detected only from one light intensity distribution.

In the aspect of the invention, it is preferable that a first light intensity distribution for a second coordinate detection in which the light intensity monotonically decreases from one side of a second direction which intersects with the light exiting direction of the detection lights from the light guiding plate and the first direction toward the other side thereof, and a second light intensity distribution for a second coordinate detection in which the light intensity monotonically decreases from the other side of the second direction to the one side thereof, are sequentially formed in the detection light exiting space, when the plurality of detection light sources is sequentially turned on. With such a configuration, it is possible to detect the coordinates (two dimensional coordinates) of the target object in the first and second directions which intersect with the exiting direction of the detection lights from the light guiding plate.

In the aspect of the invention, the light source driving section may differentiate the plurality of detection light sources so that the light receiving intensities in the light detector are equal to each other by changing the combination of a part of the plurality of detection light sources and the other part thereof.

In the aspect of the invention, the optical position detecting device may further include a reference light source which emits a reference light to the light detector without through the detection light exiting space. The light source driving section may differentiate the reference light source and a part of the plurality of detection light sources so that the light receiving intensities in the light detector are equal to each other by changing the combination of the reference light source and the part of the plurality of detection light sources.

In the aspect of the invention, it is preferable that the detection lights are infrared light. With such a configuration, the detection lights are not visible.

The optical position detecting device according to the aspect of the invention may be used in a display device with a position detecting function. The display device with such a position detecting function includes an image generating device which forms an image in a region overlapping with the detection light exiting space.

BRIEF DESCRIPTION OF THE DRAWINGS

The invention will be described with reference to the accompanying drawings, wherein like numbers reference like elements.

FIGS. 4A to 4D are diagrams illustrating a state where a light intensity distribution is formed by sequentially turning on detection light sources with a predetermined pattern in the optical position detecting device according to the first embodiment of the invention.

FIGS. 7A to 7D are diagrams illustrating effects of a first light emitting element and a second light emitting element when the X coordinate is detected, in the optical position detecting device according to the first embodiment of the invention.

DESCRIPTION OF EXEMPLARY EMBODIMENTS

Here, embodiments of the invention will be described in detail with reference to the accompanying drawings. In the following description, it is assumed that intersecting axes are the X, Y, and Z axes. In the figures, the X axial direction (first direction) represents a transverse direction, the Y axial direction (second direction) represents a longitudinal direction, and the Z axial direction (third direction) represents a direction in which a detection light proceeds in a detection light exiting space, for ease of description. Further, in the figures, one side of the X axial direction is the side of X1, the other side thereof is the side of X2, one side of the Y axial direction is the side of Y1, and the other side thereof is the side of Y2. Further, in the figures, a reduction scale is applied differently to each part so that each part can have a size recognizable in the figure.

First Embodiment

Overall Configuration of Optical Position Detecting Device

Figure 1A:
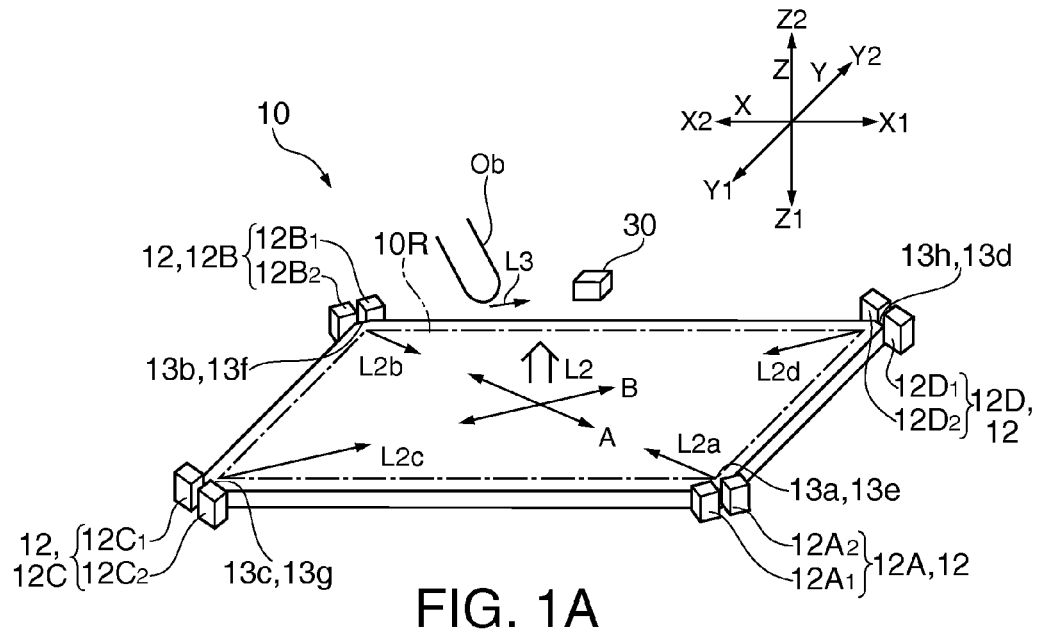
FIGS. 1A and 1B are diagrams illustrating main parts of an optical position detecting device according to a first embodiment of the invention.
Figure 1B:
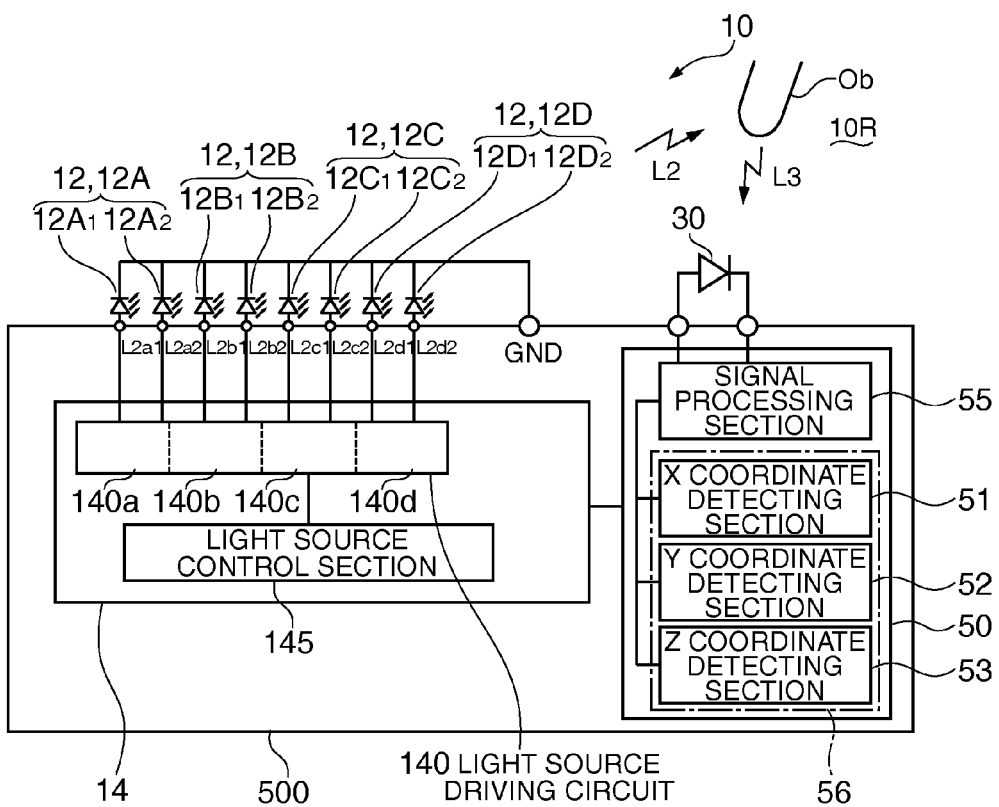
Figure 2A:
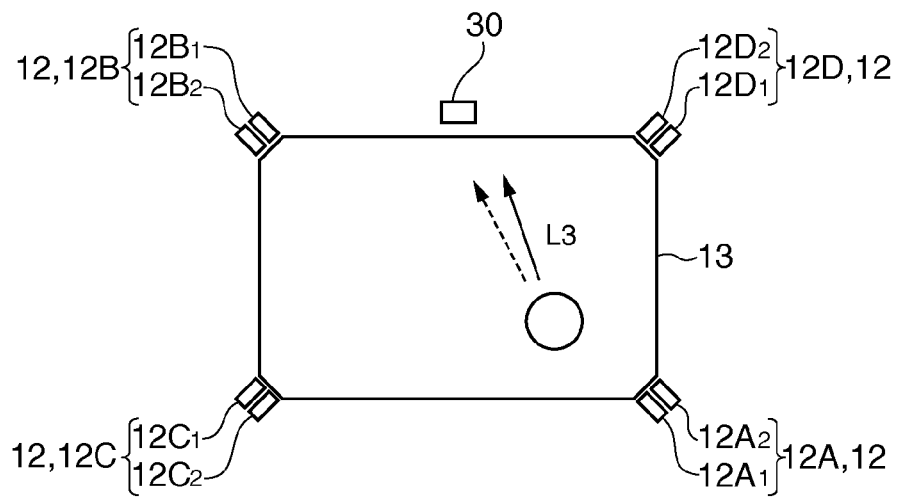
FIGS. 2A to 2C are diagrams illustrating detection lights used in the optical position detecting device according to the first embodiment of the invention.
Figure 2B:
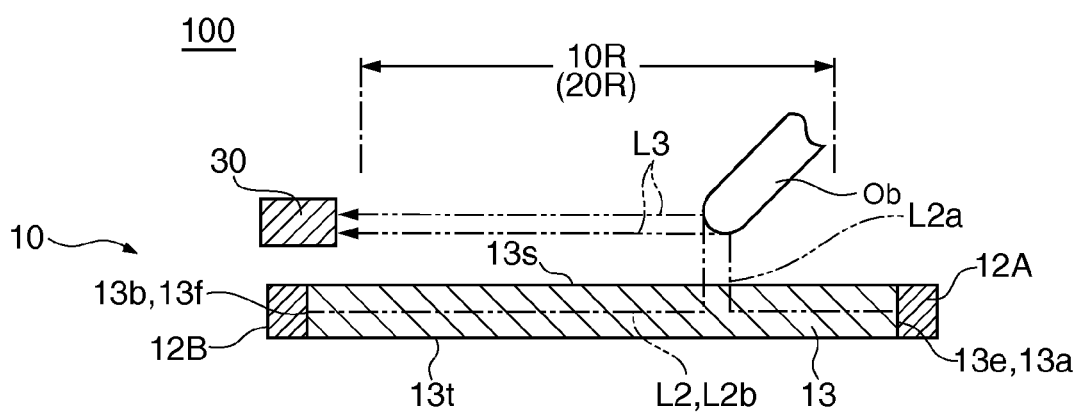
Figure 2C:
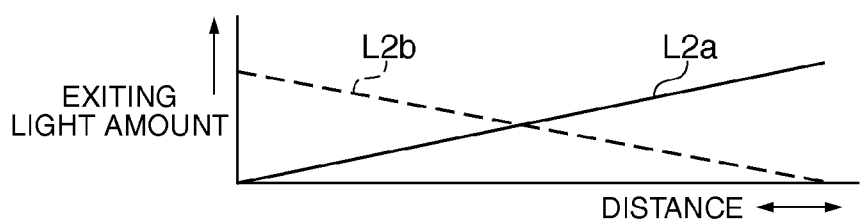

FIGS. 1A and 1B are diagrams illustrating main parts of an optical position detecting device according to a first embodiment of the invention, in which FIG. 1A is a diagram illustrating a layout of optical components used in the optical position detecting device, and FIG. 1B is a diagram illustrating an electric configuration of the optical position detecting device. FIGS. 2A, 2B, and 2C are diagrams illustrating detection lights used in the optical position detecting device according to the first embodiment of the invention, in which FIG. 2A is a plane diagram illustrating a state where light reflected by a target object is received in a light detector, FIG. 2B is a cross-sectional diagram illustrating a state where light reflected by the target object is received in the light detector, and FIG. 2C is a diagram illustrating an attenuation state of a detection light in a light guiding plate.

As shown in FIGS. 1A and 1B, FIGS. 2A and 2B, the optical position detecting device 10 in this embodiment includes a plurality of detection light sources 12 (detection light sources 12A to 12D) which emits detection lights L2, and a light detector 30 which detects a part of a detection light L3 which is reflected from a target object Ob in a detection space 10R (exiting space of the detection light L2), in the detection light L2 emitted from the detection light sources 12.

In the optical position detection device 10 according to this embodiment, four detection light sources 12A to 12D are used as the plurality of detection light sources 12. Further, the plurality of detection light sources 12 (detection light sources 12A to 12D) includes first light emitting elements (first light emitting elements $12A_1$ to $12D_1$), and second light emitting elements (second light emitting elements $12A_2$ to $12D_2$), respectively. In the detection light source 12A in the detection light sources 12, the first light emitting element $12A_1$ and the second light emitting elements $12A_2$ are disposed to be adjacent to each other. Further, in the other detection light sources 12B to 12D, in a similar way to the detection light source 12A, first light emitting elements $12B_1$ to $12D_1$, and second light emitting elements $12B_2$ to $12D_2$ are disposed to be adjacent to each other. All of the first light emitting element $12A_1$ and the second light emitting element $12A_2$ are configured by an LED (light emitting diode) or the like, and emit the detection lights L2 as diverging light. Further, all of the first light emitting elements $12A_1$ to $12D_1$ and the second light emitting elements $12A_2$ to $12D_2$ emit the detection lights L2 made of infrared light as diverging light. Here, the first light emitting elements $12A_1$ to $12D_1$ and the second light emitting elements $12A_2$ to $12D_2$ emit the detection lights L2 having peaks in different wavelength bands. For example, the first light emitting elements $12A_1$ to $12D_1$ emit first detection lights $L2a_1$ to $L2d_1$ having a peak in the vicinity of a wavelength of 1000 nm, but the second light emitting elements $12A_2$ to $12D_2$ emit second detection lights $L2a_2$ to $L2d_2$ having a peak in the vicinity of a wavelength of 850 nm.

Further, the optical position detection device 10 in this embodiment includes a light guiding plate 13 such as a transparent resin plate made of polycarbonate, acrylic resin, or the like, and the detection light L2 emitted from the detection light source 12 exits to the detection space 10R through the light guiding plate 13. The light guiding plate 13 has an approximately rectangular planar shape. In the light guiding plate 13, a surface facing the detection space 10R is a light exiting surface 13s. Further, four corner portions 13a to 13d of the light guiding plate 13 are used as light incident portions 13e to 13h of the detection lights L2 emitted from the detection light sources 12. More specifically, in the detection light sources 12A to 12D, the first light emitting elements $12A_1$ to $12D_1$ and the second light emitting elements $12A_2$ to $12D_2$ have light emitting surfaces directing toward the corner portions 13a to 13d in positions facing the corner portions 13a to 13d of the light guiding plate 13, respectively. Thus, the detection lights L2a to L2d (first detection lights $L2a_1$ to $L2d_1$ and second detection lights $L2a_2$ to $L2d_2$) emitted from the detection light sources 12A to 12D are incident through the corner portions 13a to 13d of the light guiding plate 13, and then exit from the light exiting surface 13s while propagating inside the light guiding plate 13. For example, the detection light L2a (first detection light $L2a_1$ and second detection light $L2a_2$) emitted from the detection light source 12A exits from the light exiting surface 13s while propagating inside the light guiding plate 13. Accordingly, if the detection light L2 exiting from the light exiting surface 13s of the light guiding plate 13 into the detection space 10R is reflected by the target object Ob disposed in the detection space 10R, the detection light L3 which is reflected by the target object Ob is detected by the light detector 30.

Here, on a rear surface 13t of the light guiding plate 13 or the light exiting surface 13s, a surface concave-convex structure, a prism structure, a scattering layer (not shown), or the like is provided. According to such a light scattering structure, the lights which are incident from the corner portions 13a to 13d and propagate inside the light guiding plates are gradually deflected by moving along the propagation direction thereof, and exit from the light exiting surface 13s. Further, in order to obtain the uniformity of detection lights L2a to L2d as necessary, an optical sheet such as a prism sheet or a light scattering plate may be disposed on the light emission side of the light guiding plate 13. Thus, the light amount of the detection light L2a exiting to the detection space 10R is linearly attenuated according to a distance from the detection light source 12A, as indicated by a solid line in FIG. 2C. Further, the light amount of the detection light L2b exiting to the detection space 10R is linearly attenuated according to a distance from the detection light source 12B, as indicated by a dashed line in FIG. 2C. Similarly, the detection lights L2c and L2d exiting from the other detection light sources 12C and 12D exit from the light exiting surface 13s while being attenuated. Accordingly, the detection light L2 forms a light intensity distribution which will be described later with reference to FIGS. 3A to 3D and FIGS. 5A to 5D in the detection space 10R.

In the detection light sources 12A to 12D, the first light emitting elements $12A_1$ to $12D_1$ and the second light emitting elements $12A_2$ to $12D_2$ are turned on at different timings. Here, the first detection lights $L2a_1$ to $L2d_1$ emitted from the first light emitting elements $12A_1$ to $12D_1$ and the second detection lights $L2a_2$ to $L2d_2$ emitted from the second light emitting elements $12A_2$ to $12D_2$ propagate inside the light guiding plate 13 and exit while being attenuated, as described with reference to FIG. 2C, respectively.

The light detector 30 includes a light receiving section which has a light receiving element made of a photodiode, a phototransistor, or the like and directs toward the detection space 10R in an approximately central position of a side portion of the light guiding plate 13 from the outside of the detection space 10R. In this embodiment, the light detector 30 is made of the photodiode.

Electric Configuration of Optical Position Detecting Device 10

As shown in FIG. 1B, the optical position detecting device 10 includes a light source driving section 14 which drives the detection light sources 12 (detection light sources 12A to 12D) and a position detecting section 50 in which a detection result is output from the light detector 30. The light source driving section 14 and the position detecting section 50 are configured by a common semiconductor integrated circuit 500, for example. The light source driving section 14 includes a light source driving circuit 140 (light source driving circuits 140a to 140d) which drive the detection light sources 12 (detection light sources 12A to 12D) and a light source control section 145 which controls the detection light sources 12 (detection light sources 12A to 12D) through the light source driving circuit 140. Here, the light source driving circuits 140a to 140d turn on the first light emitting element $12A_1$ and the second light emitting element $12A_2$ at different timings.

The position detecting section 50 includes a signal processing section 55 and a coordinate detecting section 56, and the coordinate detecting section 56 detects a position of the target object Ob on the basis of the detection result in the light detector 30. In this embodiment, the coordinate detecting section 56 includes an X coordinate detecting section 51, a Y coordinate detecting section 52, and a Z coordinate detecting section 53. The light source control section 145 and the position detecting section 50 are connected with each other by a signal line. Driving for the detection light source 12 and a detection operation in the position detecting section 50 are performed linked with each other.

Light Intensity Distribution

FIGS. 3A to 3D are diagrams illustrating detection lights emitted from the detection light sources 12 (detection light sources 12A to 12D) in the optical position detecting device 10 according to the first embodiment of the invention. FIGS. 4A to 4D are diagrams illustrating a state where light intensity distribution is formed by sequentially turning on the detection light sources 12 (detection light sources 12A to 12D) with a predetermined pattern in the optical position detecting device 10 according to the first embodiment of the invention. FIGS. 5A to 5D are diagrams illustrating a state where a light intensity distribution for coordinate detection is formed by the detection light L2 emitted from the detection light sources 12, in the optical position detecting device 10 according to the first embodiment of the invention. In FIGS. 4A to 4D, detection light sources 12 which are turned on are indicated by a gray color. Further, in the detection light sources 12A to 12D, the first light emitting elements $12A_1$ to $12D_1$ and the second light emitting elements $12A_2$ to $12D_2$ are turned on at different timings. However, a case where only the first light emitting elements $12A_1$ to $12D_1$ are turned on, or a case where only the second light emitting elements $12A_2$ to $12D_2$ are turned on is different in the intensity in the light intensity distribution but is the same in intensity change according to positions, compared with a case where the first light emitting elements $12A_1$ to $12D_1$ and the second light emitting elements $12A_2$ to $12D_2$ are simultaneously turned on. Accordingly, regardless of the case where only the first light emitting elements $12A_1$ to $12D_1$ are turned on, or the case where only the second light emitting elements $12A_2$ to $12D_2$ are turned on, the description will be made to the case where the detection light sources 12A to 12D are turned on, with reference to FIGS. 3A to 6B.

Figure 3A:
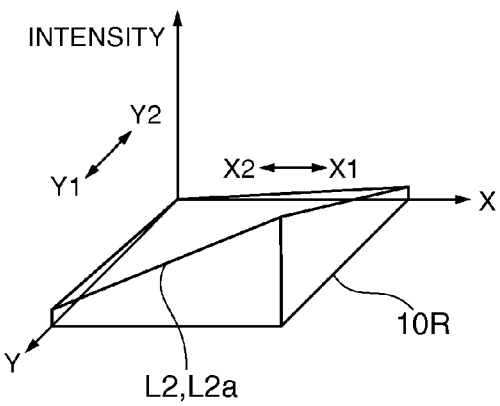
FIGS. 3A to 3D are diagrams illustrating detection lights emitted from detection light sources in the optical position detecting device according to the first embodiment of the invention.
Figure 3B:
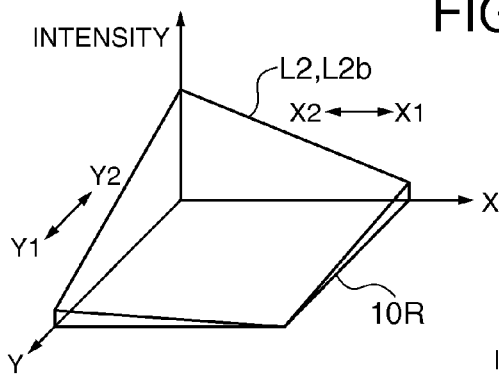
Figure 3C:
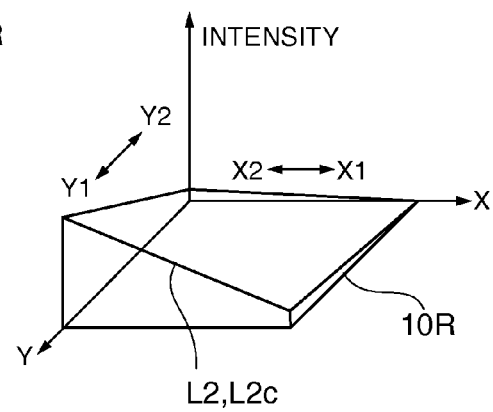
Figure 3D:
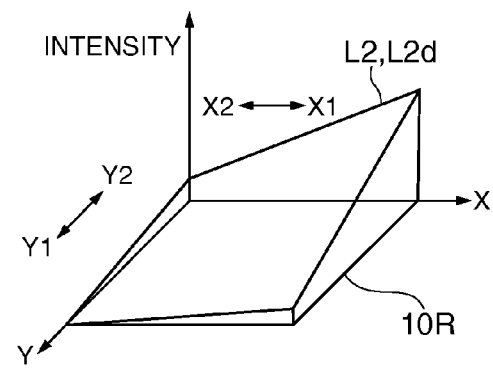

In the optical position detecting device 10 according to this embodiment, if the detection light source 12A is turned on and the other detection light sources 12B to 12D are in a turned off state, as shown in FIG. 3A, a light intensity distribution is formed centering around corner portions of one side X1 in the X axial direction and one side Y1 in the Y axial direction, in the detection space 10R. If the detection light source 12B is turned on and the other detection light sources 12A, 12C, and 12D are in a turned off state, as shown in FIG. 3B, a light intensity distribution is formed centering around corner portions of the other side X2 in the X axial direction and the other side Y2 in the Y axial direction, in the detection space 10R. If the detection light source 12C is turned on and the other detection light sources 12A, 12B, and 12D are in a turned off state, as shown in FIG. 3C, a light intensity distribution is formed centering around corner portions of the other side X2 in the X axial direction and one side Y1 in the Y axial direction, in the detection space 10R. If the detection light source 12D is turned on and the other detection light sources 12A to 12C are in a turned off state, as shown in FIG. 3D, a light intensity distribution is formed centering around corner portions of one side X1 in the X axial direction and the other side Y2 in the Y axial direction, in the detection space 10R.

Figure 5A:
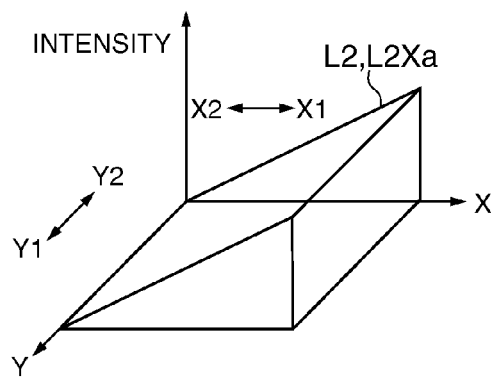
FIGS. 5A to 5D are diagrams illustrating a state where a light intensity distribution for coordinate detection is formed by detection lights emitted from detection light sources, in the optical position detecting device according to the first embodiment of the invention.

Accordingly, as shown in FIG. 4A, if the detection light sources 12A and 12D are in a turned on state and the other detection light sources 12A and 12B are in a turned off state, as shown in FIG. 5A, a first light intensity distribution L2Xa for X coordinate detection (first light intensity distribution for first coordinate detection) is formed in which the intensity of the detection light monotonically decreases from one side X1 in the X axial direction toward the other side X2. In this embodiment, in the first light intensity distribution L2Xa for X coordinate detection, the intensity of the detection light L2 linearly decreases from one side X1 in the X axial direction toward the other side X2, and the intensity of the detection light L2 is constant in the Y axial direction.

Figure 5C:
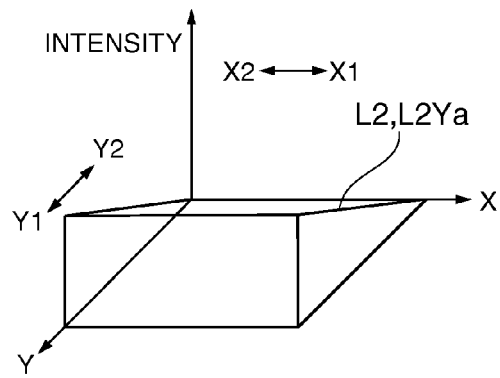
Figure 5B:
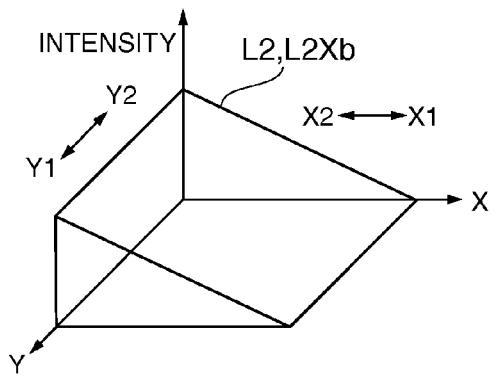

On the other hand, as shown in FIG. 4B, if the detection light sources 12B and 12C are in a turned on state, and other detection light sources 12A and 12D are in a turned off state, as shown in FIG. 5B, a second light intensity distribution L2Xb for X coordinate detection (second light intensity distribution for a first coordinate detection) is formed in which the intensity of the detection light monotonically decreases from the other side X2 in the X axial direction toward one side X1. In this embodiment, in the second light intensity distribution L2Xb for X coordinate detection, the intensity of the detection light L2 linearly decreases from the other side X2 in the X axial direction toward one side X1, and the intensity of the detection light L2 is constant in the Y axial direction.

Further, as shown in FIG. 4C, if the detection light sources 12A and 12C are in a turned on state, and other detection light sources 12B and 12D are in a turned off state, as shown in FIG. 5C, a first light intensity distribution L2Ya for Y coordinate detection (first light intensity distribution for second coordinate detection) is formed in which the intensity of the detection light monotonically decreases from one side Y1 in the Y axial direction toward the other side Y2. In this embodiment, in the first light intensity distribution L2Ya for Y coordinate detection, the intensity of the detection light L2 linearly decreases from one side Y1 in the Y axial direction toward the other side Y2, and the intensity of the detection light L2 is constant in the X axial direction.

Figure 5D:
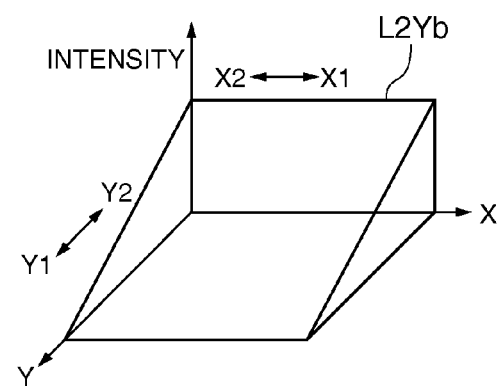

On the other hand, as shown in FIG. 4D, if the detection light sources 12B and 12D are in a turned on state, and other detection light sources 12A and 12C are in a turned off state, as shown in FIG. 5D, a second light intensity distribution L2Yb for Y coordinate detection (second light intensity distribution for second coordinate detection) is formed in which the intensity of the detection light monotonically decreases from the other side Y2 in the Y axial direction toward one side Y1. In this embodiment, in the second light intensity distribution L2Yb for Y coordinate detection, the intensity of the detection light L2 linearly decreases from the other side Y2 in the Y axial direction toward one side Y1, and the intensity of the detection light L2 is constant in the X axial direction.

Although not shown, if four detection light sources 12 (detection light sources 12A to 12D) are all turned on, a light intensity distribution for Z coordinate detection is formed in which the intensity decreases from one side Z1 in the Z axial direction toward the other side Z2, from the light guiding plate 13. In such a light intensity distribution for Z coordinate detection, the intensity monotonically decreases in the Z axial direction. This change can be considered as an approximately linear change in a limited space of the detection space 10R.

Further, in the light intensity distribution for Z coordinate detection, the intensity is constant in the X axial direction and the Y axial direction.

Basic Principle of X Coordinate Detection

In the optical position detecting device 10 according to this embodiment, the detection light source 12 for light intensity distribution formation is turned on to form the light intensity distribution of the detection light L2 in the detection space 10R, and the detection light L2 which is reflected by the target object Ob is detected using the light detector 30. The position detecting section 50 detects the position of the target object Ob in the detection space 10R, on the basis of the detection result in the light detector 30. Then, the coordinate detection principle will be described with reference to FIGS. 6A and 6B. When position information about the target object Ob in the detection space 10R is obtained on the basis of the detection result in the light detector 30, for example, a configuration may be employed in which a micro processor unit (MPU) is used as the light source control section 145 or the position detecting section 50 to allow predetermined software (operation program) to be executed, thereby performing the processes. Further, a configuration may be employed in which hardware such as a logic circuit is used.

Figure 6A:
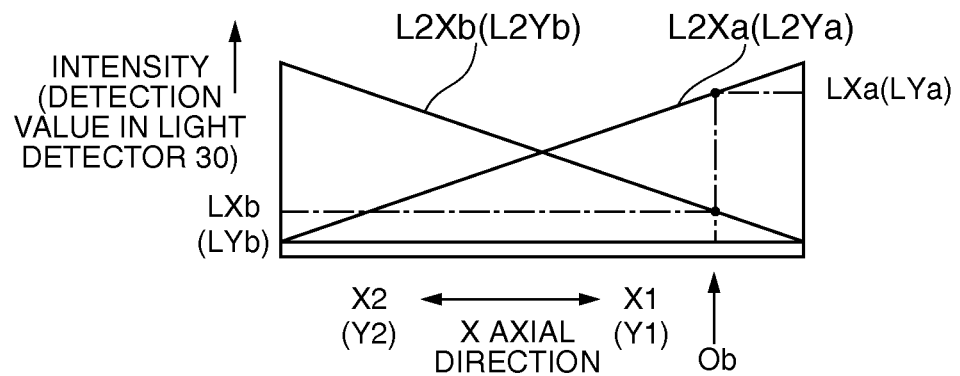
FIGS. 6A and 6B are diagrams schematically illustrating the principle of the optical position detecting device according to the first embodiment of the invention.
Figure 6B:
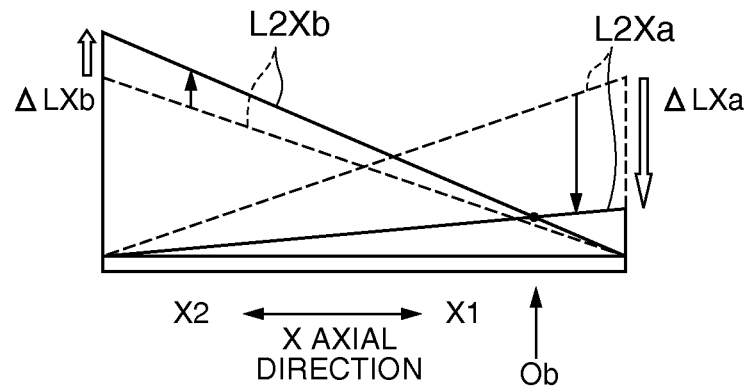

FIGS. 6A and 6B are diagrams schematically illustrating the principle of the optical position detecting device 10 according to the first embodiment of the invention, in which FIG. 6A is a diagram illustrating the intensities of the detection lights reflected from the target object, and FIG. 6B is a diagram illustrating a state where the light intensity distributions of the detection lights are adjusted so that the intensities of the detection lights reflected by the target object become equivalent.

In the optical position detecting device 10 according to this embodiment, the position (X coordinate) in the X axial direction is detected using the first light intensity distribution L2xa for X coordinate detection and the second light intensity distribution L2Xb for X coordinate detection, described with reference to FIGS. 5A and 5B. At this time, the detection light sources 12A and 12D and the detection light sources 12B and 12C are driven with reversed phases. More specifically, in a first period for X coordinate detection, the detection light sources 12A and 12D are turned on and the detection light sources 12B and 12C are turned off, to thereby form the first light intensity distribution L2Xa for X coordinate detection shown in FIG. 5A. Then, the detection light sources 12A and 12D are turned off and the detection light sources 12B and 12C are turned on, to thereby form the second light intensity distribution L2Xb for X coordinate detection shown in FIG. 5B. Accordingly, if the target object Ob is disposed in the detection space 10R, the detection light L2 is reflected by the target object Ob, and apart of the reflected light is detected by the light detector 30. Here, the first light intensity distribution L2Xa for X coordinate detection and the second light intensity distribution L2Xb for X coordinate detection have a constant distribution. Thus, if the X coordinate detecting section 51 compares the detection intensity in the light detector 30 in the first period for X coordinate detection with the detection intensity in the light detector 30 in a second period for X coordinate detection, it is possible to detect the X coordinate of the target object Ob, using a method which will be described with reference to FIGS. 6A and 6B, for example.

For example, in a first method, the difference or ratio between the first light intensity distribution L2Xa for X coordinate detection and the second light intensity distribution L2Xb for X coordinate detection in FIG. 6A, is used. More specifically, since the first light intensity distribution L2Xa for X coordinate detection and the second light intensity distribution L2Xb for X coordinate detection are predetermined distributions, the difference or ratio between the first light intensity distribution L2Xa for X coordinate detection and the second light intensity distribution L2Xb for X coordinate detection also depend on a predetermined function. Accordingly, if the difference or ratio between a detection value LXa in the light detector 30 when the first light intensity distribution L2Xa for X coordinate detection is formed in the first period for X coordinate detection and a detection value LXb in the light detector 30 when the second light intensity distribution L2Xb for X coordinate detection is formed in the second period for X coordinate detection is calculated, it is possible to detect the X coordinate of the target object Ob. According to such a method, even in a case where environmental light other than the detection light L2, for example, an infrared component included in outside light is incident to the light detector 30, since when the difference between the detection values LXa and LXb is calculated, the intensity of the infrared component included in the environmental light is offset, the infrared component included in the environmental light does not influence the detection accuracy.

Next, in a second method, the X coordinate of the target object Ob is detected on the basis of the adjustment amount when the control amount (driving electric current) for the detection light sources 12 is adjusted so that the detection value LXa in the light detector 30 when the first light intensity distribution L2Xa for X coordinate detection is formed in the first period for X coordinate detection becomes equal to the detection value LXb in the light detector 30 when the second light intensity distribution L2Xb for X coordinate detection is formed in the second period for X coordinate detection. Such a method can be applied to a case where the first light intensity distribution L2Xa for X coordinate detection and the second light intensity distribution L2Xb for X coordinate detection are linearly changed in the X coordinate.

Firstly, as shown in FIG. 6A, in the first period for X coordinate detection and in the second period for X coordinate detection, the first light intensity distribution L2Xa for X coordinate detection and the second light intensity distribution L2Xb for X coordinate detection are formed to have the same absolute value and to be reversed in the X axial direction. In this state, if the detection value LXa in the light detector 30 in the first period for X coordinate detection is equal to the detection value LXb in the light detector 30 in the second period for X coordinate detection, it can be understood that the target object Ob is disposed in the center in the X axial direction.

On the other hand, in a case where the detection value LXa in the light detector 30 in the first period for X coordinate detection is different from the detection value LXb in the light detector 30 in the second period for X coordinate detection, the control amount (driving electric current) for the detection light sources 12 is adjusted so that the detection values LXa and LXb become equal to each other, to thereby form the first light intensity distribution L2Xa for X coordinate detection in the first period for X coordinate detection, and to form the second light intensity distribution L2Xb for X coordinate detection in the second period for X coordinate detection, as shown in FIG. 6B, again. Thus, the detection value LXa in the light detector 30 in the first period for X coordinate detection is equal to the detection value LXb in the light detector 30 in the second period for X coordinate detection. It is possible to detect the X coordinate of the target object Ob, using the ratio, the difference, or the like between the control amount (electric current value) for the detection light sources 12A and 12D and the control amount (electric current value) for the detection light sources 12A and 12D when such a differential is performed. Further, it is possible to detect the X coordinate of the target object Ob, using the ratio, the difference, or the like between an adjustment amount ΔLXa of the control amount for the detection light sources 12 in the first period for X coordinate detection and an adjustment amount ΔLXb of the control amount for the detection light sources 12 in the second period for X coordinate detection. According to such a method, even in a case where environmental light other than the detection light L2, for example, an infrared component included in outside light is incident to the light detector 30, since when adjustment of the control amount for the detection light sources 12 is performed so that the detection values LXa and LXb become equal to each other, the intensity of the infrared component included in the environmental light is offset, the infrared component included in the environmental light does not influence the detection accuracy.

In this way, when the X coordinate is detected, in the optical position detecting device 10, the detection light sources 12A to 12D include the first light emitting elements $12A_1$ to $12D_1$ and the second light emitting elements $12A_2$ to $12D_2$, respectively. The first light emitting elements $12A_1$ to $12D_1$ and the second light emitting elements $12A_2$ to $12D_2$ have peaks in different bands. Thus, in this embodiment, as described later with reference to FIGS. 7A to 7D, the difference between the detection intensity in the light detector 30 when only the first light emitting elements $12A_1$ to $12D_1$ are turned on and the detection intensity in the light detector 30 when only the second light emitting elements $12A_2$ to $12D_2$ are turned on is used as the detection values LXa and LXb.

Basic Principle of Y Coordinate Detection

In the display device 100 with a position detecting function according to this embodiment, the position (Y coordinate) in the Y axial direction is detected using a first light intensity distribution L2Ya for Y coordinate detection and the second light intensity distribution L2Yb for Y coordinate detection, described with reference to FIGS. 5C and 5D. More specifically, the detection light sources 12A and 12C and the detection light sources 12B and 12D are driven with reversed phases. That is, as shown in FIGS. 5C and 5D, and FIG. 6A, in a first period for Y coordinate detection, the detection light sources 12A and 12C are turned on and the detection light sources 12B and 12D are turned off, to thereby form the first light intensity distribution L2Ya for Y coordinate detection shown in FIGS. 5C and 6A. Then, in a second period for Y coordinate detection, the detection light sources 12A and 12C are turned off and the detection light sources 12B and 12D are turned on, to thereby form the second light intensity distribution L2Yb for Y coordinate detection shown in FIGS. 5D and 6A. Accordingly, using the same method as the method of detecting the X coordinate, for example, by allowing the Y coordinate detection section 52 to compare a detection value LYa in the light detector 30 in the first period for Y coordinate detection with a detection value LYb in the light detector 30 in the second period for Y coordinate detection, it is possible to detect Y coordinate of the target object Ob.

Further, in this embodiment, as described later with reference to FIG. 8, when the Y coordinate is detected, in a similar way to the X coordinate detection, the difference between the detection intensity in the light detector 30 when only the first light emitting elements $12A_1$ to $12D_1$ are turned on and the detection intensity in the light detector 30 when only the second light emitting elements $12A_2$ to $12D_2$ are turned on is used as the detection values LYa and LYb.

Basic Principle of Z Coordinate Detection

When the Z coordinate is detected in the optical position detecting device 10 according to this embodiment, all the detection light sources 12A to 12D are turned on, and a light intensity distribution for Z coordinate detection in which the intensity is monotonically changed in the Z axial direction is formed. Accordingly, if the target object Ob is disposed in the detection space 10R, the detection light L2 is reflected by the target object Ob, and a part of the reflected light is detected by the light detector 30. Here, since the light intensity distribution for Z coordinate detection is a constant distribution, it is possible to detect the Z coordinate of the target object Ob on the basis of the detection intensity in the light detector 30.

Further, in this embodiment, when the Z coordinate is detected, in a similar way to the X and Y coordinate detections, the difference between the detection intensity in the light detector 30 when only the first light emitting elements $12A_1$ to $12D_1$ are turned on and the detection intensity in the light detector 30 when only the second light emitting elements $12A_2$ to $12D_2$ are turned on is used.

Application of First Light Emitting Elements $12A_1$ to $12D_1$ and the Second Light Emitting Elements $12A_2$ to $12D_2$ FIGS. 7A to 7D are diagrams illustrating effects of the first light emitting elements $12A_1$ to $12D_1$ and the second light emitting elements $12A_2$ to $12D_2$ when the X coordinate is detected, in the optical position detecting device 10 according to the first embodiment of the invention. FIGS. 8A to 8D are diagrams illustrating effects of the first light emitting elements $12A_1$ to $12D_1$ and the second light emitting elements $12A_2$ to $12D_2$ when the Y coordinate is detected, in the optical position detecting device 10 according to the first embodiment of the invention. In FIGS. 7A to 7D and 8A to 8D, the turned on detection light sources 12 are indicated by a gray color.

In the optical position detecting device 10 according to this embodiment, as described with reference to FIGS. 6A and 6B or the like, the X coordinate of the target object Ob is detected on the basis of the detection value LXa in the light detector 30 when the first light intensity distribution L2Xa for X coordinate detection is formed in the first period for X coordinate detection and the detection value LXb in the light detector 30 when the second light intensity distribution L2Xb for X coordinate detection is formed in the second period for X coordinate detection. Further, the Y coordinate of the target object Ob is detected, on the basis of the detection value LYa in the light detector 30 when the first light intensity distribution L2Ya for Y coordinate detection is formed in the first period for Y coordinate detection and the detection value LYb in the light detector 30 when the second light intensity distribution L2Yb for Y coordinate detection is formed in the second period for Y coordinate detection.

At this time, as shown in FIGS. 7A to 7D and 8A to 8D, if there exists a high reflection rate portion $Ob_0$ (portion in which nail polish is coated) in the object target Ob (finger), the detection intensity in the light detector 30 is a value obtained by adding the increase amount of the reflection light amount in the high reflection rate portion $Ob_0$ to the detection intensity of the reflected light (detection light L3) from the target object Ob in a case where the high reflection rate portion $Ob_0$ does not exist.

Thus, in this embodiment, as the detection light sources 12A to 12D, the first light emitting elements $12A_1$ to $12D_1$ and the second light emitting elements $12A_2$ to $12D_2$ are disposed. The first light emitting elements $12A_1$ to $12D_1$ and the second light emitting elements $12A_2$ to $12D_2$ emit the first detection lights $L2a_1$ to $L2d_1$ and the second detection lights $L2a_2$ to $L2d_2$ having peaks at different bands. Further, one side of the first detection lights $L2a_1$ to $L2d_1$ emitted from the first light emitting elements $12A_1$ to $12D_1$ and the second detection lights $L2a_2$ to $L2d_2$ emitted from the second light emitting elements $12A_2$ to $12D_2$ have a wavelength which is likely to be influenced by the reflection light in the high reflection rate portion $Ob_0$.

Accordingly, as described below with reference to FIGS. 7A to 7D, when the X coordinate is detected, if the difference between the detection intensity in the light detector 30 when only the first light emitting elements $12A_1$ to $12D_1$ are turned on and the detection intensity in the light detector 30 when only the second light emitting elements $12A_2$ to $12D_2$ are turned on is used as the detection values LXa and Lxb, it is possible to offset the increase amount of the light by reflection in the high reflection rate portion $Ob_0$. Further, as described below with reference to FIGS. 8A to 8D, when the Y coordinate is detected, the difference between the detection intensity in the light detector 30 when only the first light emitting elements $12A_1$ to $12D_1$ are turned on and the detection intensity in the light detector 30 when only the second light emitting elements $12A_2$ to $12D_2$ are turned on is used as the detection values LYa and LYb, it is possible to offset the increase amount of the light by reflection in the high reflection rate portion $Ob_0$. Thus, in a finger which is the target object Ob, even though there are portions having different reflection rates in the target object Ob due to nail polish coated on the nail, it is possible to detect the X and Y coordinates of the target object Ob with high accuracy.

More specifically, as shown in FIG. 7A, in the first period for X coordinate detection, only the first light emitting element $12A_1$ and the first light emitting element $12D_1$ are turned on to form the first light intensity distribution L2Xa for X coordinate detection, to thereby obtain the detection intensity $LXa_1$ in the light detector 30 at that time. Further, as shown in FIG. 7B, only the second light emitting element $12A_2$ and the second light emitting element $12D_2$ are turned on to form the first light intensity distribution L2Xa for X coordinate detection, to thereby obtain the detection intensity $LXa_2$ in the light detector 30 at that time. Then, a value obtained by the following subtraction equation, $LXa=LXa_1-LXa_2$, is the detection value LXa described with reference to FIGS. 6A and 6B.

Further, as shown in FIG. 7C, in the second period for X coordinate detection, only the first light emitting element $12B_1$ and the first light emitting element $12C_1$ are turned on to form the second light intensity distribution L2Xb for X coordinate detection, to thereby obtain the detection intensity $LXb_1$ in the light detector 30 at that time. Further, as shown in FIG. 7D, only the second light emitting element $12B_2$ and the second light emitting element $12C_2$ are turned on to form the second light intensity distribution L2Xb for X coordinate detection, to thereby obtain the detection intensity $LXb_2$ in the light detector 30 at that time. Then, a value obtained by the following subtraction equation, $LXb=LXb_1-LXb_2$, is the detection value LXb described with reference to FIGS. 6A and 6B.

Further, the method described with reference to FIGS. 6A and 6B is performed by using the detection values LXa and LXb. More specifically, the X coordinate of the target object Ob is detected on the basis of the difference or ratio between the detection value LXa including the difference between the detection intensities $LXa_1$ and $LXa_2$ and the detection value LXb including the difference between the detection intensities $LXb_1$ and $LXb_2$, in the light detector 30. Alternatively, the X coordinate of the target object Ob is detected on the basis of the difference or ratio between the control amounts after the control amounts (electric currents) for the detection light sources 12 are adjusted, or the difference or ratio between adjustment amounts ΔLXa and ΔLXb, so that the detection value LXa including the difference between the detection intensities $LXa_1$ and $LXa_2$, and the detection value LXb including the difference between the detection intensities $LXb_1$ and $LXb_2$, in the light detector 30, are equal to each other. According to such a configuration, it is possible to enhance the linear relationship between the detection values LXa and LXb and the position of the target object Ob. Thus, it is possible to detect the X coordinate of the target object Ob with high accuracy.

Figure 8A:
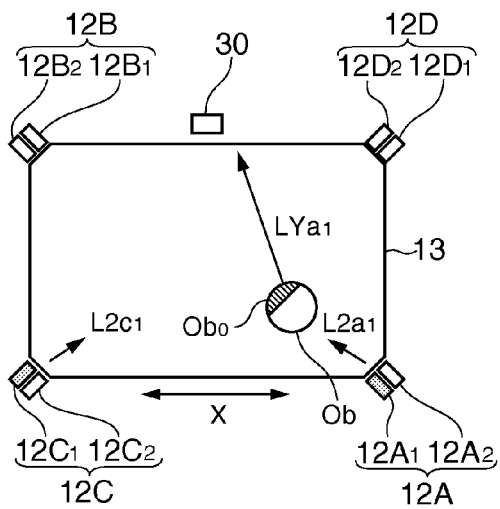
FIGS. 8A to 8D are diagrams illustrating effects of a first light emitting element and a second light emitting element when the Y coordinate is detected, in the optical position detecting device according to the first embodiment of the invention.

Similarly, as shown in FIG. 8A, in the first period for Y coordinate detection, only the first light emitting element $12A_1$ and the first light emitting element $12C_1$ are turned on to form the first light intensity distribution L2Ya for Y coordinate detection, to thereby obtain the detection intensity $LYa_1$ in the light detector 30 at that time. Further, as shown in FIG. 8B, only the second light emitting element $12A_2$ and the second light emitting element $12C_2$ are turned on to form the first light intensity distribution L2Ya for Y coordinate detection, to thereby obtain the detection intensity $LYa_2$ in the light detector 30 at that time. Then, a value obtained by the following subtraction equation, $LYa=LYa_1-LYa_2$, is the detection value LYa described with reference to FIGS. 6A and 6B.

Figure 8C:
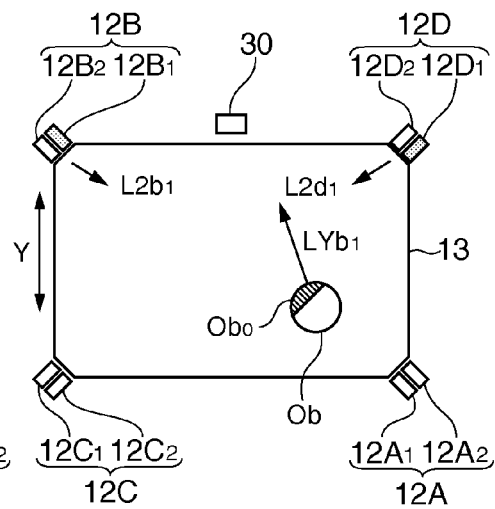
Figure 8B:
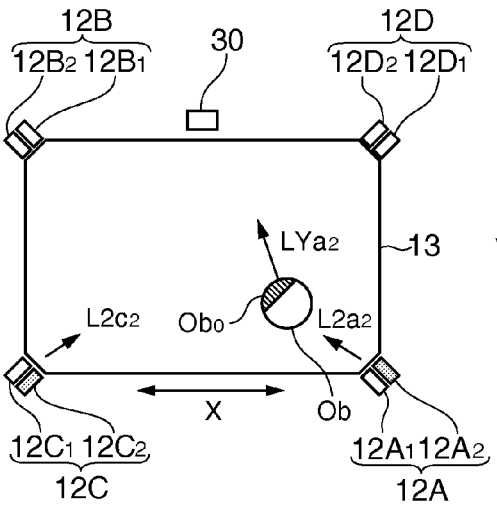
Figure 8D:
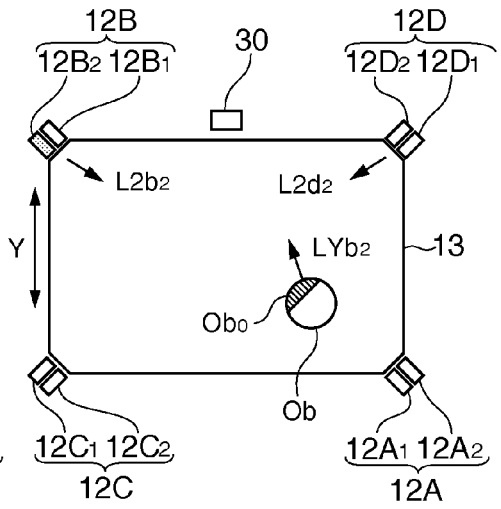

Further, as shown in FIG. 8C, in the second period for Y coordinate detection, only the first light emitting element $12B_1$ and the first light emitting element $12D_1$ are turned on to form the second light intensity distribution L2Yb for Y coordinate detection, to thereby obtain the detection intensity $LYb_1$ in the light detector 30 at that time. Further, as shown in FIG. 8D, only the second light emitting element $12B_2$ and the second light emitting element $12D_2$ are turned on to form the second light intensity distribution L2Yb for Y coordinate detection, to thereby obtain the detection intensity $LYb_2$ in the light detector 30 at that time. Then, a value obtained by the following subtraction equation, $LYb=LYb_1-LYb_2$, is the detection value LYb described with reference to FIGS. 6A and 6B.

Further, the method described with reference to FIGS. 6A and 6B is performed by using the detection values LYa and LYb. More specifically, the Y coordinate of the target object Ob is detected on the basis of the difference or ratio between the detection value LYa including the difference between the detection intensities $LYa_1$ and $LYa_2$, and the detection value LYb including the difference between the detection intensities $LYb_1$ and $LYb_2$, in the light detector 30. Alternatively, the Y coordinate of the target object Ob is detected on the basis of the difference or ratio between the control amounts after the control amounts (electric currents) for the detection light sources 12 are adjusted, or the difference or ratio between adjustment amounts ΔLYa and ΔLYb, so that the detection value LYa including the difference between the detection intensities $LYa_1$ and $LYa_2$, and the detection value LYb including the difference between the detection intensities $LYb_1$ and $LYb_2$, in the light detector 30, are equal to each other. According to such a configuration, it is possible to enhance the linear relationship between the detection values LYa and LYb and the position of the target object Ob. Thus, it is possible to detect the Y coordinate of the target object Ob with high accuracy.

Similarly, in the Z coordinate detection period, if the Z coordinate is detected, using as the detection value the difference between the detection intensity in the light detector 30 when all the first light emitting elements $12A_1$ to $12D_1$ are turned on and the detection intensity in the light detector 30 when all the second light emitting elements $12A_2$ to $12D_2$ are turned on, it is possible to detect the Z coordinate of the target object Ob with high accuracy.

Main Effects of this Embodiment

As described above, in the optical position detecting device 10 according to this embodiment, the plurality of detection light sources 12 is sequentially turned on to emit the detection light L2, a part of the detection light L3 reflected by the target object Ob which is disposed in the detection space 10R (detection light exiting space) is received by the light detector 30, and the position of the target object Ob is detected on the basis of the detection intensity in the light detector 30. Thus, the target object Ob may be a finger or the like, and may not necessarily be a light emitting indicating device.

In such an optical position detecting device 10, in a case where the target object Ob is a finger with nail polish, for example, the reflection intensity becomes high in the nail polished portion compared with other portions, and thus, a position other than the position of the target object Ob influences the detection intensity in the light detector 30. Further, in this embodiment, as the detection light sources 12A to 12D, the first light emitting elements $12A_1$ to $12D_1$ and the second light emitting elements $12A_2$ to $12D_2$ are disposed. The first light emitting elements $12A_1$ to $12D_1$ and the second light emitting elements $12A_2$ to $12D_2$ emit the first detection lights $L2a_1$ to $L2d_1$ and the second detection lights $L2a_2$ to $L2d_2$ having peaks at different bands. Thus, for example, if the peak in the second detection lights $L2a_2$ to $L2d_2$ is in a band corresponding to the wavelength band reflected by the nail polish, when the difference between the detection intensity of the first detection lights $L2a_1$ to $L2d_1$ and the detection intensity of the second detection lights $L2a_2$ to $L2d_2$, in the light detector 30, is calculated, it is possible to compensate the amount of light intensity reflected by the nail polish from the detection intensity in the light detector 30. Thus, it is possible to detect the X coordinate, Y coordinate, and Z coordinate of the target object Ob with high accuracy.

Further, in this embodiment, since the light guiding plate 13 which includes the plurality of light incident sections 13e to 13h and the light exiting surface 13s is provided, it is possible to form the first light intensity distribution L2Xa for X coordinate detection and the second light intensity distribution L2Xb for X coordinate detection, and also to form the first light intensity distribution L2Ya for Y coordinate detection and the second light intensity distribution L2Yb for Y coordinate detection. Thus, since it is possible to detect the X coordinate and Y coordinate of the target object Ob using the light intensity distributions in which the intensities are changed under a predetermined condition in opposite directions, it is possible to detect the X coordinate and Y coordinate of the target object Ob without influence of environmental light or the like, compared with a case where the position of the target object Ob is detected only from one light intensity distribution. Further, since it is possible to form the light intensity distribution for Z coordinate detection by turning on all the plurality of detection light sources 12, the Z coordinate of the target object Ob can be detected.

Furthermore, since the detection light L2 is infrared light, this is not visible. Thus, when a display device with a position detecting function which will be described later, or the like, is configured, it is advantageous that a visual contact of information is not prevented by the detection light L2.

Second Embodiment

Figure 9A:
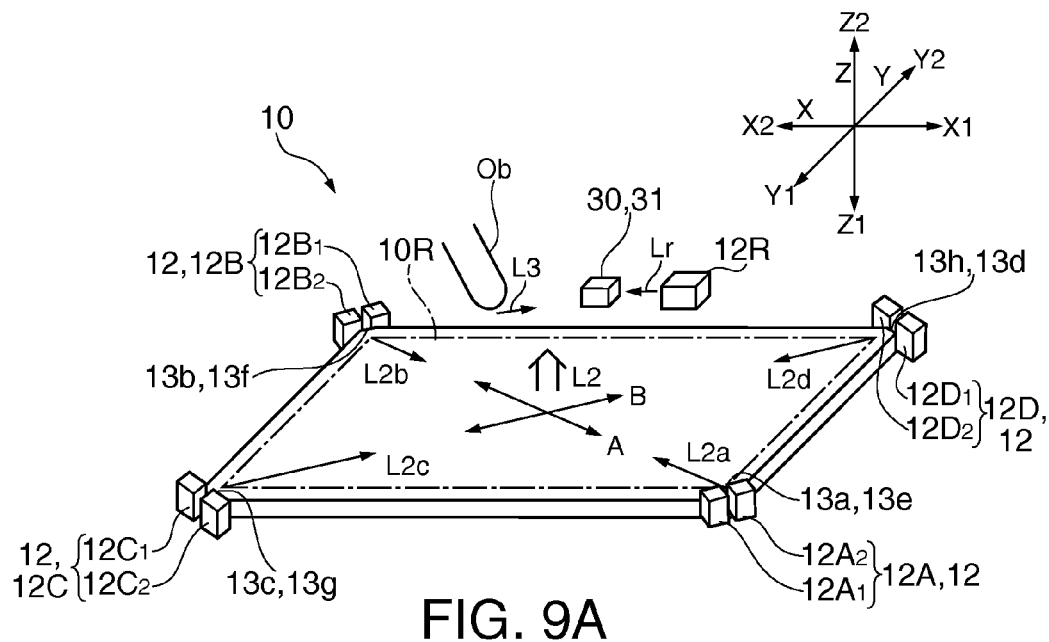
FIGS. 9A and 9B are diagrams illustrating main parts of an optical position detecting device according to a second embodiment of the invention.
Figure 9B:
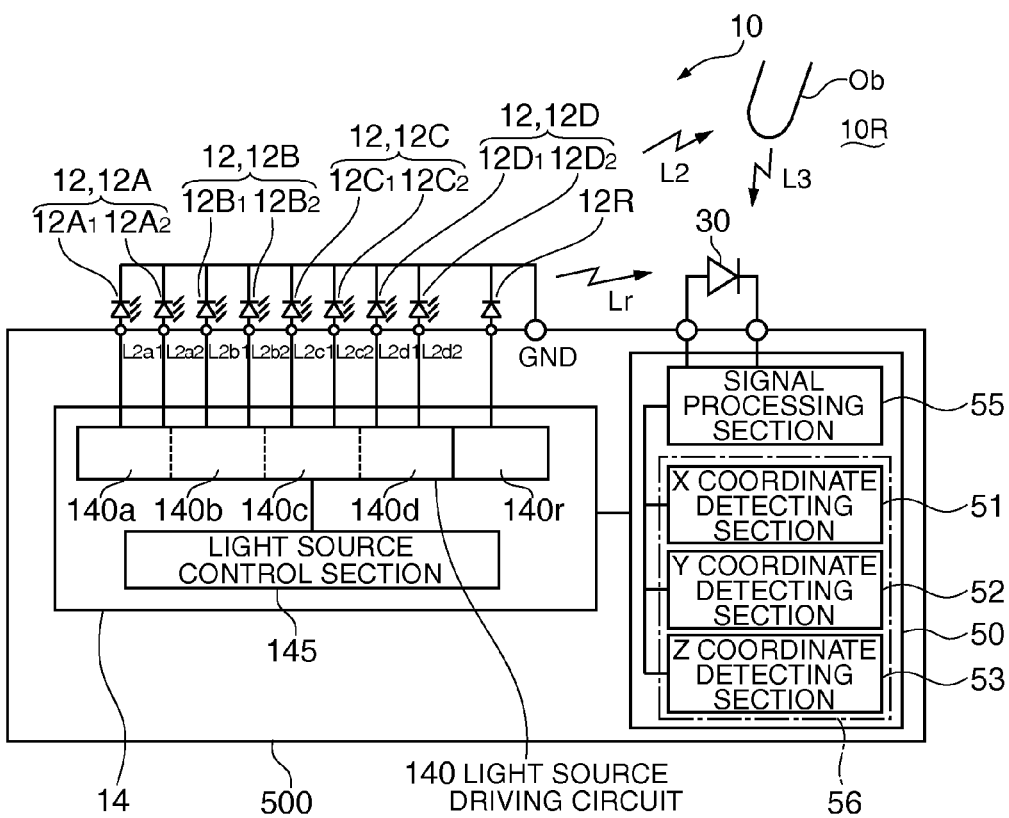

FIGS. 9A and 9B are diagrams illustrating main parts of the optical position detecting device 10 according to a second embodiment of the invention, in which FIG. 9A is a diagram illustrating a layout of optical components using the optical position detecting device 10, and FIG. 9B is a diagram illustrating an electric configuration of the optical position detecting device 10. Since a basic configuration of this embodiment is the same as that of the first embodiment, the same reference numerals are given to the same parts, and thus, description thereof will be omitted.

As shown in FIGS. 9A and 9B, the optical position detecting device 10 according to this embodiment includes a plurality of detection light sources 12 (detection light sources 12A to 12D) which emits a detection light L2, and a light detector 30 which detects a part of a detection light L3 which is reflected from a target object Ob in a detection space 10R (exiting space of the detection light L2), in the detection light L2 emitted from the detection light sources 12, in a similar way to the first embodiment. Further, the optical position detecting device 10 according to this embodiment includes a light guiding plate 13 such as a transparent resin plate made of polycarbonate, acrylic resin, or the like. The detection light L2 emitted from the detection light source 12 exits into the detection space 10R through the light guiding plate 13. Further, in a similar way to the first embodiment, in the optical position detecting device 10 according to this embodiment, as the detection light sources 12A to 12D, the first light emitting elements $12A_1$ to $12D_1$ and the second light emitting elements $12A_2$ to $12D_2$ are disposed. The first light emitting elements $12A_1$ to $12D_1$ and the second light emitting elements $12A_2$ to $12D_2$ emit the first detection lights $L2a_1$ to $L2d_1$ and the second detection lights $L2a_2$ to $L2d_2$ having peaks at different bands.

Further, the optical position detecting device 10 according to this embodiment includes a reference light source 12R which emits a reference light Lr to the light detector 30 without passing through the detection space 10R. The reference light source 12R is driven by a light source driving circuit 140r. The reference light Lr is infrared light, in a similar way to the detection light L2.

In the optical position detecting device 10 with such a configuration, when an initial condition of the detection light sources 12A to 12D or the light detector 30 is set, the detection intensity in the light detector 30 of the reference light Lr emitted from the reference light source 12R may be used as a reference.

Further, when the X coordinate, Y coordinate, and Z coordinate of the target object Ob are detected using the principle described with reference to FIGS. 6A and 6B, a combination of the reference light source 12R and a part of the plurality of detection light sources 12 is changed to be alternately turned on by the light source driving section 14, and thus, a result obtained by comparing detection intensities of the reference light Lr in the first light detector 31 and the second light detector 32 with the detection intensity of the detection light L3 reflected by the target object Ob can be utilized. For example, it is possible to detect the position of the target object Ob, using the difference or ratio between driving electric currents for the detection light sources 12 at the time when the reference light source 12R is differentiated from the part of the detection light sources 12 so that the detection intensities in the light detector 30 are equal to each other, and driving electric currents for the detection light sources 12 at the time when the reference light source 12R is differentiated from the other part of the detection light sources 12 so that the detection intensities in the light detector 30 are equal to each other. At this time, if the difference between the detection intensity in the first light detector 30 when only the first light emitting elements $12A_1$ to $12D_1$ are turned on and the detection intensity in the light detector 30 when only the second light emitting elements $12A_2$ to $12D_2$ are turned on is used as the detection intensity in the light detector 30 when the detection light sources 12 are turned on, even though nail polish exists in the finger as the target object Ob, it is possible to detect the position of the target object Ob with high accuracy.

Other Embodiments

In the above-described embodiment, the invention is applied to the optical position detecting device 10 in which the light intensity distribution is formed using the light guiding plate 13. However, the invention may be applied to the optical position detecting device 10 without using the light guiding plate 13.

Further, in the above-described embodiment, the invention is applied to the optical detecting device 10 which includes four detection light sources 12. However, the invention may be applied to the optical position detecting device 10 which includes three or five or more detection light sources 12.

First Specific Example of Display Device With Position Detecting Function

Figure 10:
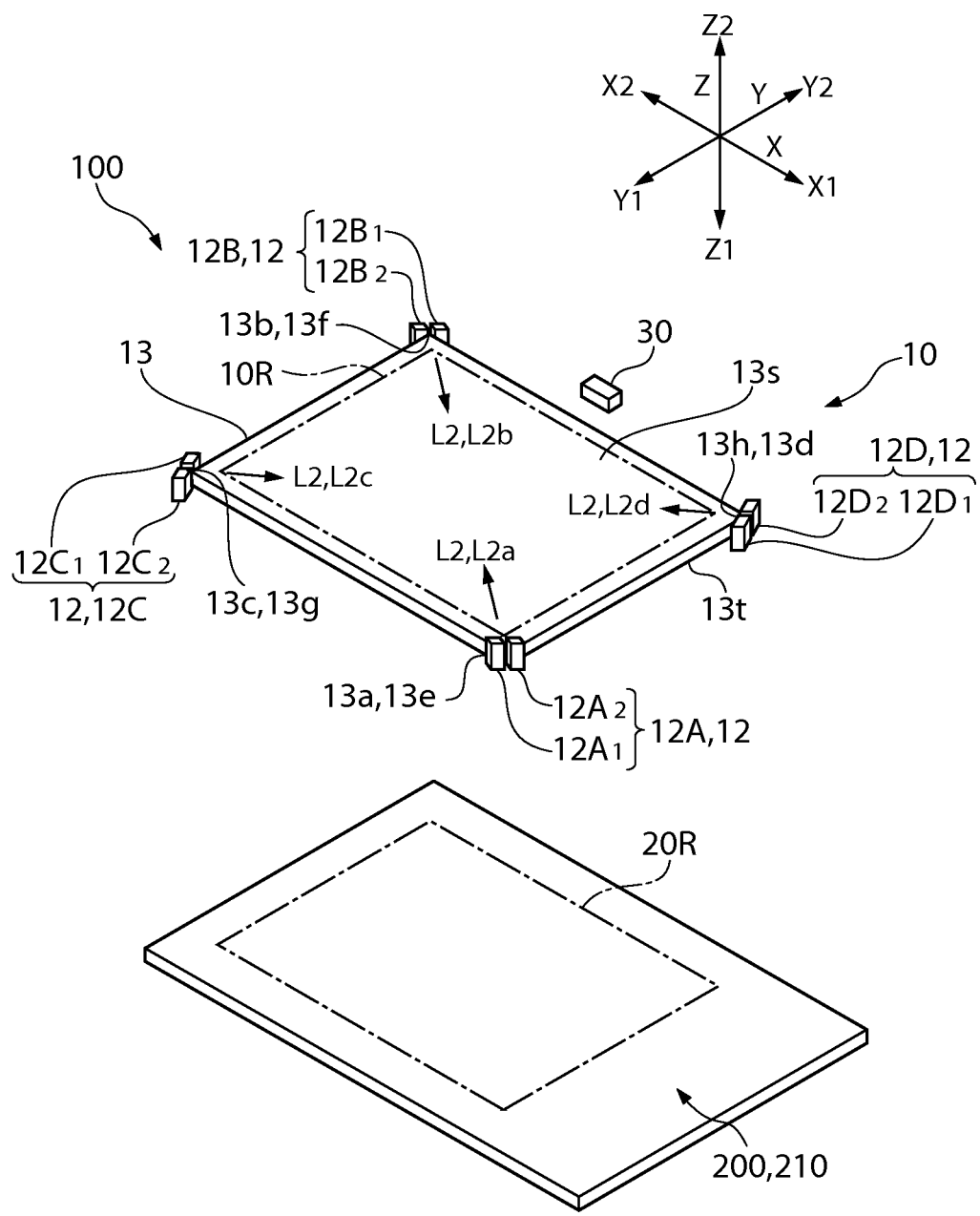
FIG. 10 is an exploded perspective view of a display device with a position detecting function which includes the optical position detecting device to which the invention is applied, which illustrates a cross-sectional configuration thereof.
Figure 11:
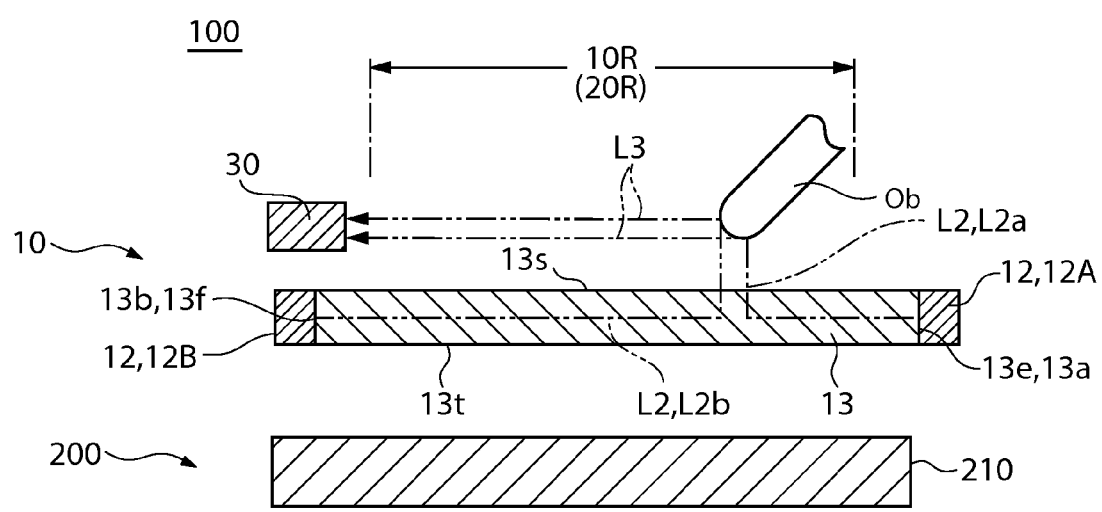
FIG. 11 is a diagram illustrating a cross-sectional configuration of a display device with a position detecting function which includes the optical position detecting device to which the invention is applied.

FIG. 10 is an exploded perspective view of a display device with a position detecting function which includes the optical position detecting device 10 to which the invention is applied, and FIG. 11 is a diagram illustrating a cross-sectional configuration thereof. In the display device 100 with the position detecting function, since the configuration of the optical position detecting device 10 is the same as in the above-described embodiment, the same reference numerals are given to the same parts, and thus, description thereof will be omitted.

The display device 100 with the position detecting function shown in FIGS. 10 and 11 includes the optical position detecting device 10 and an image generating device 200. The optical position detecting device 10 includes detection light sources 12 (detection light sources 12A to 12D) which emit detection lights, a light guiding plate 13, and a light detector 30 which has a receiving section directing toward the detection space 10R. The image generating device 200 is a direct-view display device 210 such as an organic electroluminescence device or a plasma display device, and is disposed on a side opposite to an input manipulation side in the optical position detecting device 10. The direct-view display device 210 includes an image display region 20R in a region which overlaps with the light guiding plate 13 when seen from a planar view, and the image display region 20R overlaps with the detection space 10R when seen from a planar view.

According to such a configuration, when the image formed by the image generating device 200 is indicated by a finger (target object Ob) or the like, since the indication position can be detected by the optical position detecting device 10, it is possible to utilize the position of the finger as input information.

Second Specific Example of Display Device With Position Detecting Function

Figure 12:
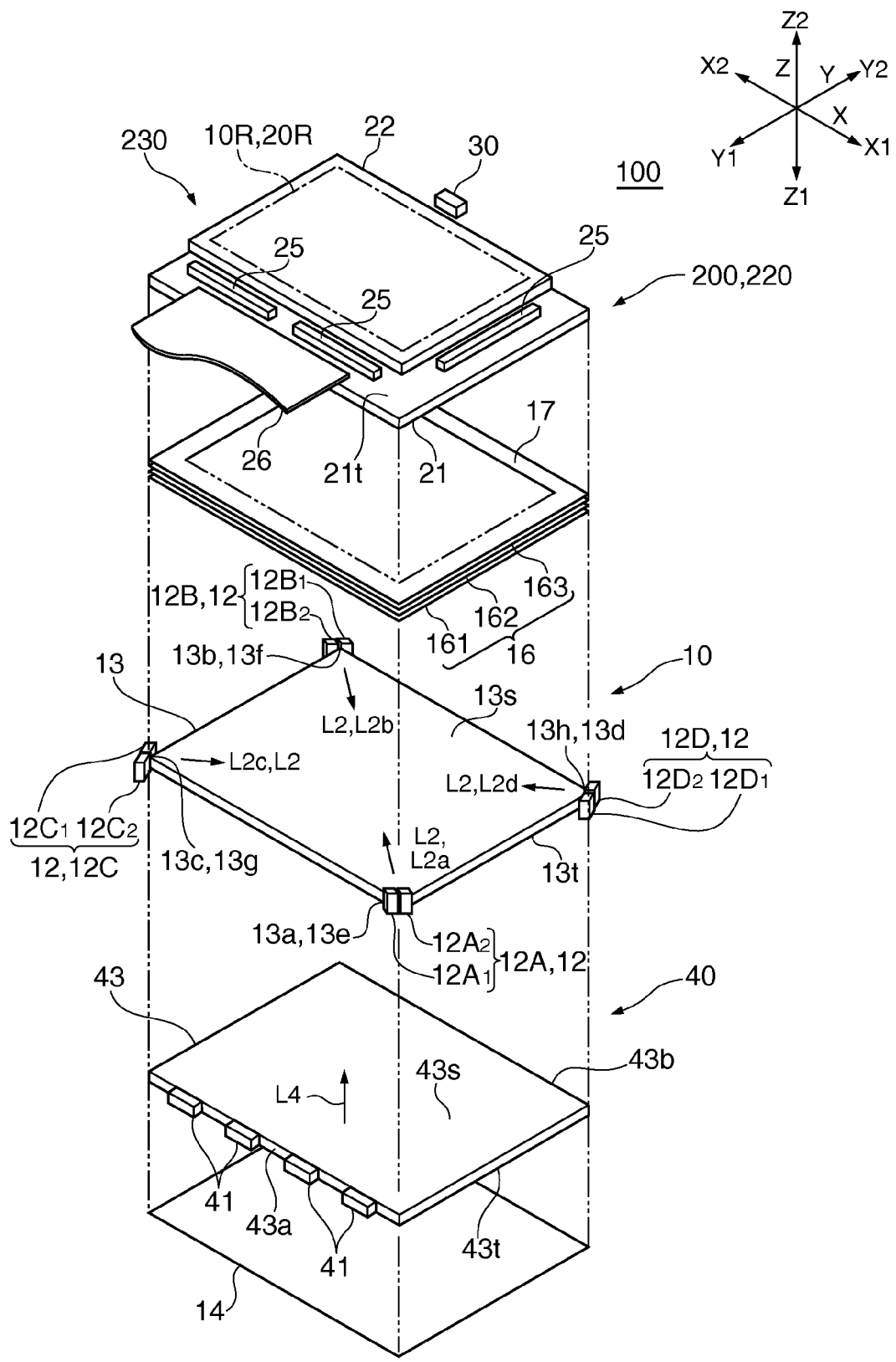
FIG. 12 is an exploded perspective view of another display device with a position detecting function to which the invention is applied.
Figure 13:
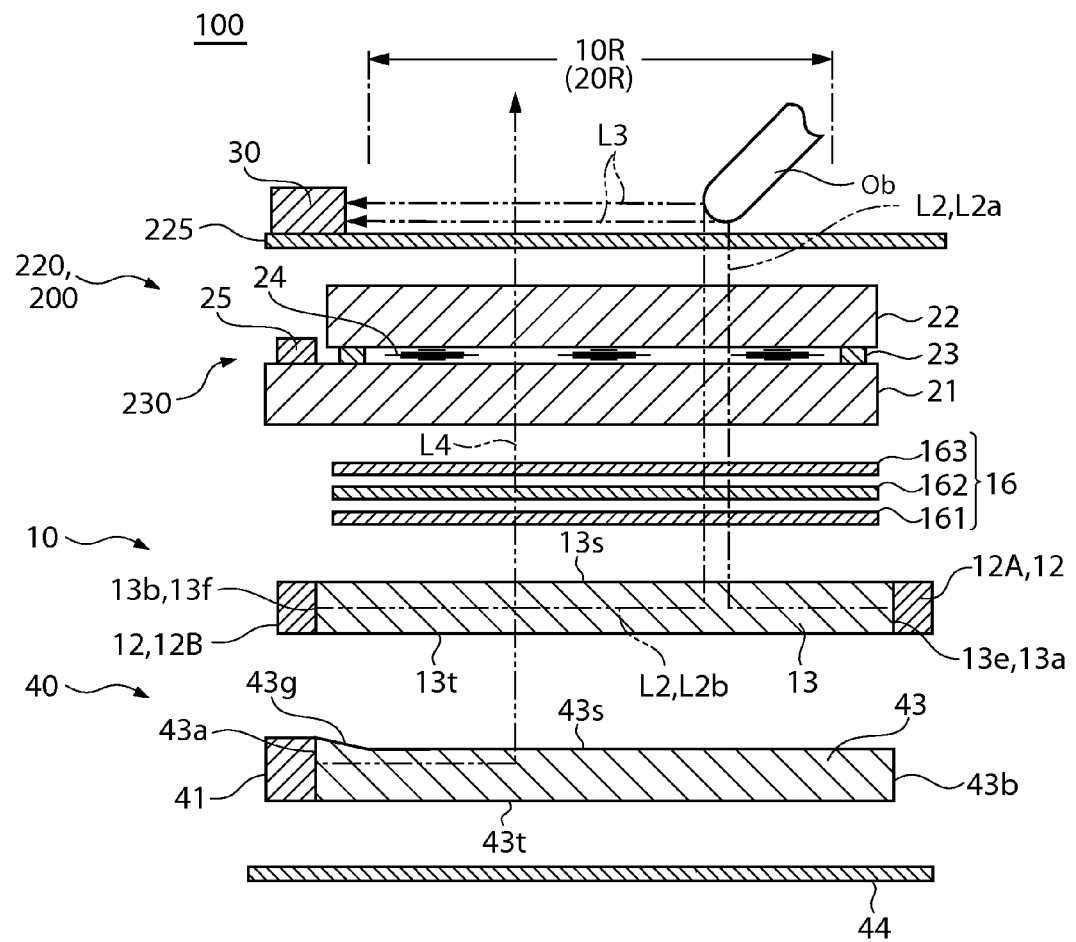
FIG. 13 is a diagram illustrating a cross-sectional configuration of still another display device with a position detecting function to which the invention is applied.

FIG. 12 is an exploded perspective view of another display device 100 with a position detecting function to which the invention is applied, and FIG. 13 is a diagram illustrating a cross-sectional configuration thereof. In the display device 100 with the position detecting function, since the configuration of the optical position detecting device 10 is the same as in the above-described embodiment, the same reference numerals are given to the same parts, and thus, description thereof will be omitted.

The display device 100 with the position detecting function shown in FIGS. 12 and 13 includes the optical position detecting device 10 and the image generating device 200. The optical position detecting device 10 includes the detection light sources 12 (detection light sources 12A to 12D) which emit detection lights, the light guiding plate 13, and the light detector 30 which has a receiving section directing toward the detection space 10R. The image generating device 200 includes a liquid crystal device 220 which is a direct-view display device, and a translucent cover 225. The liquid crystal device 220 includes the image display region 20R in the region which overlaps with the light guiding plate 13 when seen from a planar view, and the image display region 20R overlaps with the detection space 10R when seen from a planar view.

In the display device 100 with the position detecting function according to this embodiment, an optical sheet 16 for obtaining uniformity in detection lights L2a to L2d is disposed on the light exiting side of the light guiding plate 13, as necessary. In this embodiment, as the optical sheet 16, a first prism sheet 161 which faces a light exiting surface 13s of the light guiding plate 13, a second prism sheet 162 which faces the first prism sheet 161 on a side opposite to the side where the light guiding plate 13 is disposed, and a light scattering plate 163 which faces the second prism sheet 162 on a side opposite to the side where the light guiding plate 13 is disposed are used. On a side opposite to the side where the light guiding plate 13 is disposed with reference to the optical sheet 16, a light-blocking sheet of a rectangular frame shape is disposed around the optical sheet 16. Such a light-blocking sheet 17 prevents the detection lights L2a to L2d emitted from the detection light sources 12A to 12D from being leaked.

The liquid crystal device 220 (image generating device 200) includes a liquid crystal display panel 230 which is on the optical sheet 16 (first prism sheet 161, second prism sheet 162, and light scattering plate 163) on a side opposite to the side where the light guiding plate 13 is disposed. In this embodiment, the liquid crystal display panel 230 is a transmissive liquid crystal display panel, and has a structure in which two translucent substrates 21 and 22 are attached by a sealing member 23 and a liquid crystal 24 is filled between the substrates. In this embodiment, the liquid crystal display panel 230 is an active matrix type liquid crystal display panel. Translucent pixel electrodes, data lines, scanning lines, and pixel switching elements (not shown) are formed on one side of two translucent substrates 21 and 22, and a translucent common electrode (not shown) is formed on the other side thereof. The pixel electrodes and the common electrode may be formed on the same substrate. In such a liquid crystal display panel 230, if a scanning signal is output through the scanning line for each pixel, and an image signal is output through the data line, orientation of the liquid crystal 24 is controlled in each of the plurality of pixels, and thus, an image is formed on the image display region 20R.

In the liquid crystal display panel 230, the one translucent substrate 21 is formed with a substrate extending section 21t which is extended from the periphery of the other translucent substrate 22. Electronic components 25 which form driving circuits or the like are mounted on a surface of the substrate extending section 21t. Further, a wiring member 26 such as a flexible wiring substrate (FPC) is connected to the substrate extending section 21t. Only the wiring member 26 may be mounted on the substrate extending section 21t. A polarization plate (not shown) is disposed on outer surface sides of the translucent substrates 21 and 22, as necessary.

Here, in order to detect a planar position of the target object Ob, it is necessary to emit the detection lights L2a to L2d toward a visual contact side where manipulation by means of the target object Ob is performed. The liquid crystal display panel 230 is disposed to the visual contact side (manipulation side) with reference to the light guiding plate 13 and the optical sheet 16. Accordingly, in the liquid crystal display panel 230, the image display region 20R is configured to transmit the detection lights L2a to L2d. In a case where the liquid crystal display panel 230 is disposed on a side opposite to the visual contact side of the light guiding plate 13, it is not necessary that the image display region 20R transmits the detection lights L2a to L2d, but instead, it is necessary that the image display region 20R can be transmitted from the visual contact side through the light guiding plate 13.

The liquid crystal device 220 includes an illuminating device 40 which illuminates the liquid crystal display panel 230. In this embodiment, the illuminating device 40 is disposed between the light guiding plate 13 and a reflection plate 44 on a side opposite to the side where the liquid crystal display panel 230 is disposed with reference to the light guiding plate 13. The illuminating device 40 includes an illumination light source 41 and an illumination light guiding plate 43 which allows an illumination light emitted from the illumination light source 41 to propagate therein and to exit therefrom. The illumination light guiding plate 43 has a rectangular planar shape. The illumination light source 41 is configured by a detection light source such as an LED (light emitting diode), and emits a white illumination light L4, for example, according to a driving signal output from the driving circuit (not shown). In this embodiment, the plurality of illumination light sources 41 is disposed along a side portion 43a of the illumination light guiding plate 43.

The illumination light guiding plate 43 includes an inclined surface 43g disposed on a surface portion (circumferential portion of the side portion 43a of the light exiting surface 43s) on a light exiting side adjacent to the side portion 43a. The illumination light guiding plate 43 has a thickness which is gradually increased toward the side portion 43a. Through a light entrance structure having such an inclined surface 43g, the height of the side portion 43a matches with the height of the light emitting surface of the illumination light source 41, while suppressing an increase in the thickness of the portion where the light emitting surface 43s is provided.

In such an illuminating device 40, the illumination light emitted from the illumination light source 41 is incident inside the illumination light guiding plate 43 from the side portion 43a of the illumination light guiding plate 43, propagate the inside of the illumination light guiding plate 43 toward an opposite outer edge 43b, and then exits from the light exiting surface 43s which is one of the surfaces. Here, the illumination light guiding plate 43 has a light guide structure in which the ratio of the amount of light exiting from the light exiting surface 43s to the light propagating thereinside from the side portion 43a toward the opposite outer edge 43b monotonically increases. Such a light guide structure is realized, for example, by gradually increasing, along the inside propagation direction, the area of a refraction surface having a minute concave-convex shape for light deflection or light scattering formed on the light exiting surface 43s of the illumination light guide plate 43 or a rear surface 43t thereof, the formation density of a printed scattering layer, or the like. With such a light guide structure, the illumination light L4 incident from the side portion 43a exits from the light exiting surface 43s at an approximately uniform level.

In this embodiment, the illumination light guiding plate 43 is disposed to overlap in a planar manner with the image display region 20R of the liquid crystal display panel 230 on a side opposite to the visual contact side of the liquid crystal display panel 230, to thereby function as a so-called back light. Here, the illumination light guiding plate 43 may be disposed on the visual contact side of the liquid crystal display panel 230, to thereby function as a so-called front light. Further, in this embodiment, the illumination light guiding plate 43 is disposed between the light guiding plate 13 and the reflection plate 44, but the illumination light guiding plate 43 may be disposed between the optical sheet 16 and the light guiding plate 13. Furthermore, the illumination light guiding plate 43 and the light guiding plate 13 may be configured as a common light guiding plate. In addition, in this embodiment, the optical sheet 16 is commonly used between the detection lights L2a to L2d and the illumination light L4. However, exclusive dedicated optical sheet different from the optical sheet 16 may be disposed on the light emitting side of the illumination light guiding plate 43. The reason is as follows. In order to uniformize the average luminance of the illumination light L4 exiting from the light emitting surface 43s in the illumination light guiding plate 43, the light scattering plate for providing a sufficient light scattering effect is frequently used. However, if the detection lights L2a to L2d exiting from the light exiting surface 13s is significantly scattered in the light guiding plate 13, this causes interference of the position detection. Thus, since it is necessary not to use the light scattering plate or to use the light scattering plate which provides a relatively low light scattering effect, it is desirable that the light scattering plate is exclusively used for the illumination light guiding plate 43. However, the optical sheet having a light focusing effect such as a prism sheet (first prism sheet 161 or second prism sheet 162) may be commonly used.

With such a configuration, when the image formed by the image generating device 200 (liquid crystal device 220) is indicated by a finger (target object Ob) or the like, since the indication position can be detected by the optical position detecting device 10, it is possible to use the position of the finger as input information.

Third Specific Example of Display Device With Position Detecting Function

Figure 14A:
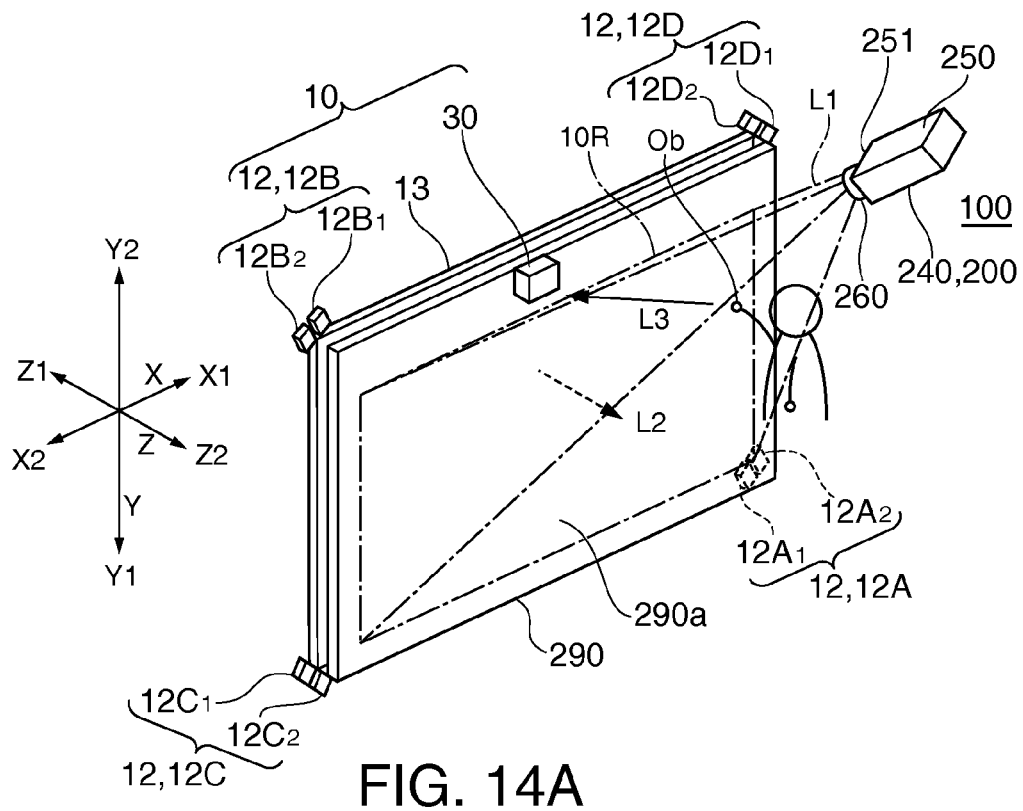
FIGS. 14A and 14B are diagrams schematically illustrating a configuration of still another display device with a position detecting function of the invention.
Figure 14B:
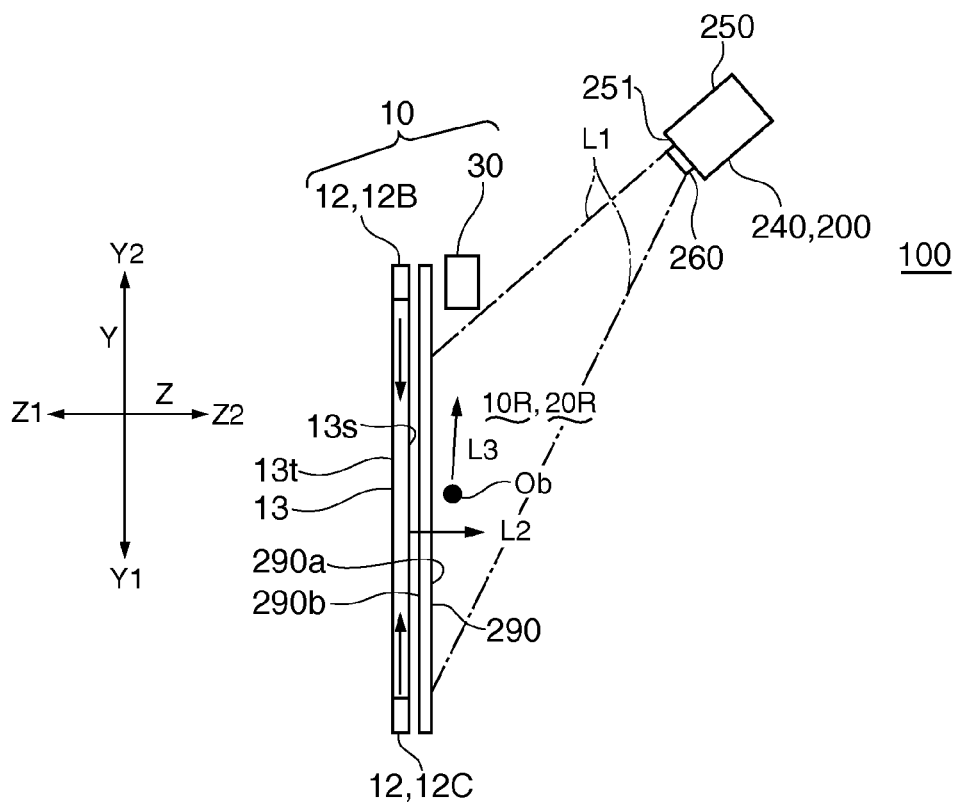
Figure 15:
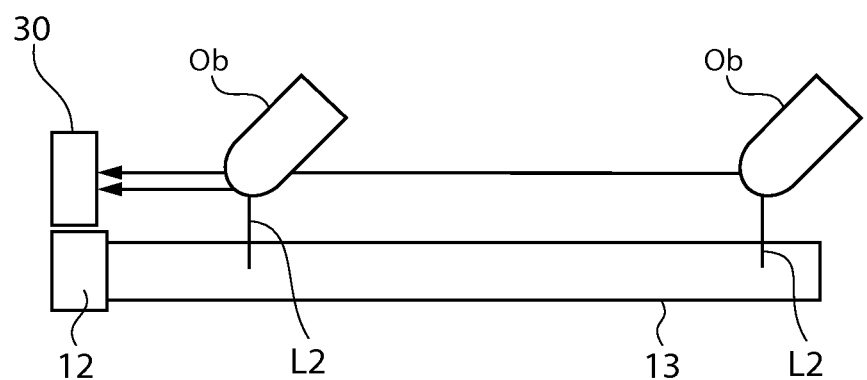
FIG. 15 is a diagram illustrating an optical position detecting device according to a reference example of the invention.

FIGS. 14A and 14B are diagrams schematically illustrating a configuration of another display device 100 with a position detecting function of the invention, in which FIG. 14A is a diagram schematically illustrating a state where main parts of the display device 100 with the position detecting function are seen in an oblique angle from above, and FIG. 14B is a diagram schematically illustrating a state seen from the transverse direction. In the display device 100 with the position detecting function according to this embodiment, since a configuration of the optical position detecting device 10 is the same as that of the above-described embodiment, the same reference numerals are given to the same parts, and thus, description thereof will be omitted.

The optical position detecting device 10 shown in FIGS. 14A and 14B is used in the display device 100 with a transmissive position detecting function. The display device 100 with the position detecting function includes an image projection device 240 (image generating device 200) called a liquid crystal projector, or a digital-micro-mirror device, and a screen member 290. The image projection device 240 enlarges and projects an image display light L1 toward the screen member 290 from a projection lens system 260 installed in a front surface section 251 of a housing 250.

The display device 100 with the position detecting function according to this embodiment is provided with the optical position detecting device 10. The optical position detecting device 10 has the function of optically detecting the position of the target object Ob in the detection space 10R set on the side of a screen surface 290a (front side of the screen member 290) in which an image is visualized in the screen member 290. In this embodiment, the detection space 10R is a rectangular region when seen along a normal line with respect to the screen member 290, which overlaps with a region (image display region 20R) to which the image is projected by the image projection device 240 in the screen member 290.

The optical position detecting device 10 in this embodiment detects the position of the target object Ob in the XY plane (detection surface) parallel to the screen member 290 in the detection space 10R. Accordingly, in the display device 100 with the position detecting function according to this embodiment, for example, a result obtained by detecting the XY coordinates of the target object Ob in the optical position detecting device 10 is considered as input information or the like in which a part of the projected image or the like is designated, and thus, it is possible to perform image switching or the like on the basis of such input information. Further, the optical position detecting device 10 in this embodiment detects the position (Z coordinate) of the target object Ob in the normal line direction (Z axial direction) with respect to the screen member 290 in the detection space 10R. Accordingly, in the display device 100 with the position detecting function according to this embodiment, for example, it is possible to consider only the case where the target object Ob is within a predetermined distance from the screen member 290 as the input information.

In such an optical position detecting device 10, the light guide plate 13 is provided on the side of a rear surface 290b of the screen member 290, and the plurality of detection light sources 12 (detection light sources 12A to 12D) is disposed around the light guiding plate 13. Further, the light detector 30 which has a light receiving section toward the detection space 10R is disposed on the side of a screen surface 290a.

According to this configuration, the detection light L2 exits from the side of the rear surface 290b of the screen member 290 to the detection space 10R. The screen member 290 has the translucency for the detection light L2. More specifically, the screen member 290 is made of fabric on which a white dye is coated with the side of the screen surface 290a or a white screen made of an embossing-processed white vinyl material, and has the translucency for the detection light L2 of the infrared light. As the screen member 290, a sliver screen having a high reflection rate, or a pearl screen having a high reflection rate obtained by performing resin processing on a fabric surface which forms the side of the screen surface 290a, or a piece screen having a high reflection rate obtained by coating a minute glass powder on the side of the screen surface 290a may be used. In this case also, the screen member 290 has the translucency for the detection light L2 of the infrared light. The screen member 290 may have a black light blocking layer on the rear surface 290b in order to enhance the quality of the displayed image. In this case, the light blocking layer may have a plurality of translucent portions made of holes.

In this embodiment, the screen device for a projection display device has been described, but a screen device with a position detecting function for an electronic blackboard may be configured by installing the optical position detecting device 10 in a screen for the electronic blackboard.

The entire disclosure of Japanese Patent Application No. 2010-133678, filed Jun. 11, 2010 is expressly incorporated by reference herein.

What is claimed is:

1. An optical position detecting device comprising:
   an illumination light source which emits an illumination light;
   a plurality of detection light source sections which includes a first light emitting element which emits a first detection light and a second light emitting element which is turned on at a timing different from a timing when the first light emitting element is turned on and emits a second detection light;
   a light source driving section which turns on a part of the plurality of detection light source sections in a first period, and turns on the other part thereof in a second period;
   a light detecting section which detects the first detection light and the second detection light after the first detection light and the second detection light are reflected by an object; and
   a position detecting section which detects a position of the object on the basis of an intensity of the first detection light and an intensity of the second detection light that are detected by the light detecting section in the first and second periods, wherein
   a light color of the illumination light is different from a light color of the first and second detection lights, and
   a peak wavelength of the first detection light is different from a peak wavelength of the second detection light.

2. The optical position detecting device according to claim 1,
   wherein the position detecting section detects the position of the object on the basis of the difference between the intensity of the first detection light and the intensity of the second detection light that are detected by the light detecting section.

3. The optical position detecting device according to claim 1,
   further comprising a light guiding plate which is provided with a light incident section to which the first detection light and the second detection light emitted from the plurality of detection light source sections are incident and a light exiting section from which the first detection light and the second detection light incident from the light incident section exit,
   wherein a first light intensity distribution for a first coordinate detection in which the light intensity monotonically decreases from one side of a first direction which intersects with a light exiting direction of the first detection light and the second detection light from the light guiding plate toward the other side thereof, and a second light intensity distribution for the first coordinate detection in which the light intensity monotonically decreases from the other side of the first direction to the one side thereof, are sequentially formed in the first period and the second period for the first coordinate detection.

4. The optical position detecting section according to claim 3, wherein a first light intensity distribution for a second coordinate detection in which the light intensity monotonically decreases from one side of a second direction which intersects with the light exiting direction of the first detection light and the second detection light from the light guiding plate and the first direction toward the other side thereof, and a second light intensity distribution for the second coordinate detection in which the light intensity monotonically decreases from the other side of the second direction to the one side thereof, are sequentially formed in the first period and the second period for the second coordinate detection.

5. The optical position detecting device according to claim 1,
   wherein the light source driving section drives the part of the plurality of detection light source sections and the other part thereof so that the detection intensity in the light detection section when the part of the plurality of detection light source sections is turned on becomes equal to the detection intensity in the light detection section when the other part thereof is turned on.

6. The optical position detecting device according to claim 1, further comprising a reference light source section which emits a reference light incident to the light detecting section without being reflected by the object, wherein the light source driving section drives the reference light source section and the part of the plurality of detection light source sections so that the detection intensity in the light detection section when the reference light source section is turned on becomes equal to the detection intensity in the light detection section when the part of the plurality of detection light source sections is turned on.

7. The optical position detecting device according to claim 1, wherein the illumination light is a white illumination light, and the first detection light and the second detection light are infrared light.

8. A display device with a position detecting function which is provided with the optical position detecting device in claim 1, comprising:

an image generating device which forms an image, wherein the first detection light and the second detection light are emitted to be overlapped with the image.

9. An optical position detecting device comprising:

a plurality of detection light source sections which includes a first light emitting element which emits a first detection light and a second light emitting element which is turned on at a timing different from a timing when the first light emitting element is turned on and emits a second detection light;

a light source driving section which turns on a part of the plurality of detection light source sections in a first period, and turns on the other part thereof in a second period;

a light detecting section which detects the first detection light and the second detection light after the first detection light and the second detection light are reflected by an object; and a position detecting section which detects a position of the object on the basis of an intensity of the first detection light and an intensity of the second detection light that are detected by the light detecting section in the first and second periods, wherein a peak wavelength of the first detection light is different from a peak wavelength of the second detection light.

10. The optical position detecting device according to claim 9, wherein the position detecting section detects the position of the object on the basis of the difference between the intensity of the first detection light and the intensity of the second detection light that are detected by the light detecting section.

11. The optical position detecting device according to claim 9, further comprising a light guiding plate which is provided with a light incident section to which the first detection light and the second detection light emitted from the plurality of detection light source sections are incident and a light exiting section from which the first detection light and the second detection light incident from the light incident section exit, wherein a first light intensity distribution for a first coordinate detection in which the light intensity monotonically decreases from one side of a first direction which intersects with a light exiting direction of the first detection light and the second detection light from the light guiding plate toward the other side thereof, and a second light intensity distribution for the first coordinate detection in which the light intensity monotonically decreases from the other side of the first direction to the one side thereof, are sequentially formed in the first period and the second period for the first coordinate detection.

12. The optical position detecting section according to claim 11, wherein a first light intensity distribution for a second coordinate detection in which the light intensity monotonically decreases from one side of a second direction which intersects with the light exiting direction of the first detection light and the second detection light from the light guiding plate and the first direction toward the other side thereof, and a second light intensity distribution for the second coordinate detection in which the light intensity monotonically decreases from the other side of the second direction to the one side thereof, are sequentially formed in the first period and the second period for the second coordinate detection.

13. The optical position detecting device according to claim 9, wherein the light source driving section drives the part of the plurality of detection light source sections and the other part thereof so that the detection intensity in the light detection section when the part of the plurality of detection light source sections is turned on becomes equal to the detection intensity in the light detection section when the other part thereof is turned on.

14. The optical position detecting device according to claim 9, further comprising a reference light source section which emits a reference light incident to the light detecting section without being reflected by the object, wherein the light source driving section drives the reference light source section and the part of the plurality of detection light source sections so that the detection intensity in the light detection section when the reference light source section is turned on becomes equal to the detection intensity in the light detection section when the part of the plurality of detection light source sections is turned on.

15. The optical position detecting device according to claim 9, wherein the first detection light and the second detection light are infrared light.

16. A display device with a position detecting function which is provided with the optical position detecting device in claim 9, comprising:

an image generating device which forms an image, wherein the first detection light and the second detection light are emitted to be overlapped with the image.

* * * * *